United States Patent
Grohoski et al.

(10) Patent No.: US 11,782,729 B2
(45) Date of Patent: Oct. 10, 2023

(54) RUNTIME PATCHING OF CONFIGURATION FILES

(71) Applicant: SambaNova Systems, Inc., Palo Alto, CA (US)

(72) Inventors: Gregory Frederick Grohoski, Bee Cave, TX (US); Manish K. Shah, Austin, TX (US); Raghu Prabhakar, San Jose, CA (US); Mark Luttrell, Cedar Park, TX (US); Ravinder Kumar, Fremont, CA (US); Kin Hing Leung, Cupertino, CA (US); Ranen Chatterjee, Fremont, CA (US); Sumti Jairath, Santa Clara, CA (US); David Alan Koeplinger, Menlo Park, CA (US); Ram Sivaramakrishnan, San Jose, CA (US); Matthew Thomas Grimm, Boise, ID (US)

(73) Assignee: SambaNova Systems, Inc., Palo Alto, CA (US)

( * ) Notice: Subject to any disclaimer, the term of this patent is extended or adjusted under 35 U.S.C. 154(b) by 277 days.

(21) Appl. No.: 16/996,666

(22) Filed: Aug. 18, 2020

(65) Prior Publication Data
US 2022/0058034 A1 Feb. 24, 2022

(51) Int. Cl.
G06F 9/44 (2018.01)
G06F 9/445 (2018.01)
G06F 9/50 (2006.01)

(52) U.S. Cl.
CPC ........ *G06F 9/44505* (2013.01); *G06F 9/5016* (2013.01)

(58) Field of Classification Search
CPC ................................. G06F 1/32; G06F 9/44
See application file for complete search history.

(56) References Cited

U.S. PATENT DOCUMENTS

| 4,769,790 A | 9/1988 | Yamashita | |
| 5,430,734 A * | 7/1995 | Gilson | H01L 22/22 714/724 |

(Continued)

FOREIGN PATENT DOCUMENTS

| CA | 3125707 A1 | 7/2020 |
| CN | 1122026 A | 5/1996 |

(Continued)

OTHER PUBLICATIONS

PCT/US2021/046368—Internation Search Report and Written Opinion, dated Nov. 24, 2021, 15 pages.

(Continued)

*Primary Examiner* — Keshab R Pandey
(74) *Attorney, Agent, or Firm* — Flagship Patents; Sikander Khan; Bruce Young

(57) ABSTRACT

A data processing system comprises a pool of reconfigurable data flow resources and a runtime processor. The pool of reconfigurable data flow resources includes arrays of physical configurable units and memory. The runtime processor includes logic to receive a plurality of configuration files for user applications. The configuration files include configurations of virtual data flow resources required to execute the user applications. The runtime processor also includes logic to allocate physical configurable units and memory in the pool of reconfigurable data flow resources to the virtual data flow resources and load the configuration files to the allocated physical configurable units. The runtime processor further includes logic to execute the user applications using the allocated physical configurable units and memory.

18 Claims, 12 Drawing Sheets

(56) References Cited

U.S. PATENT DOCUMENTS

| | | | |
|---|---|---|---|
| 5,506,797 A | 4/1996 | Koshiba | |
| 5,560,029 A | 9/1996 | Papadopoulos et al. | |
| 5,794,033 A | 8/1998 | Aldebert et al. | |
| 5,963,746 A | 10/1999 | Barker et al. | |
| 6,105,119 A | 8/2000 | Kerr et al. | |
| 6,119,181 A | 9/2000 | Vorbach et al. | |
| 6,256,653 B1 | 7/2001 | Juffa et al. | |
| 6,470,485 B1 | 10/2002 | Cote et al. | |
| 6,539,438 B1 | 3/2003 | Ledzius et al. | |
| 6,667,983 B1 | 12/2003 | Lo et al. | |
| 6,728,871 B1 | 4/2004 | Vorbach et al. | |
| 7,015,921 B1 | 3/2006 | Trivedi et al. | |
| 7,472,149 B2 | 12/2008 | Endo | |
| 7,734,895 B1 | 6/2010 | Agarwal et al. | |
| 7,797,258 B1 | 9/2010 | Bowman et al. | |
| 7,952,387 B1 | 5/2011 | Frazer | |
| 7,996,684 B2 | 8/2011 | Wasson et al. | |
| 8,006,021 B1 | 8/2011 | Li et al. | |
| 8,045,546 B1 | 10/2011 | Bao et al. | |
| 8,184,317 B2 | 5/2012 | Okamoto | |
| 8,261,042 B2 | 9/2012 | Kanstein et al. | |
| 9,009,723 B2 | 4/2015 | Degenaro et al. | |
| 9,201,899 B2 | 12/2015 | Nishimura et al. | |
| 9,335,977 B2 | 5/2016 | Wang et al. | |
| 9,411,532 B2 | 8/2016 | Vorbach et al. | |
| 9,411,756 B2 | 8/2016 | Nogueira et al. | |
| 9,501,325 B2 | 11/2016 | Pell et al. | |
| 9,569,214 B2 | 2/2017 | Govindu et al. | |
| 9,690,747 B2 | 6/2017 | Vorbach et al. | |
| 9,697,318 B2 | 7/2017 | Hutton et al. | |
| 9,875,105 B2 | 1/2018 | Rozas et al. | |
| 9,952,831 B1 | 4/2018 | Ross et al. | |
| 9,959,195 B2 * | 5/2018 | Nagaraj | H04L 67/535 |
| 10,037,227 B2 | 7/2018 | Therien et al. | |
| 10,067,911 B2 | 9/2018 | Gholaminejad et al. | |
| 10,186,011 B2 | 1/2019 | Nurvitadhi et al. | |
| 10,331,836 B1 | 6/2019 | Hosangadi et al. | |
| 10,698,853 B1 | 6/2020 | Grohoski et al. | |
| 10,831,507 B2 | 11/2020 | Shah et al. | |
| 10,936,333 B2 * | 3/2021 | Mickelsson | G06F 8/65 |
| 11,102,192 B2 * | 8/2021 | Joyner | H04L 63/0428 |
| 2001/0047509 A1 | 11/2001 | Mason et al. | |
| 2002/0156998 A1 | 10/2002 | Casselman | |
| 2003/0068097 A1 | 4/2003 | Wilson et al. | |
| 2004/0049672 A1 | 3/2004 | Nollet et al. | |
| 2004/0088666 A1 | 5/2004 | Poznanovic et al. | |
| 2004/0153608 A1 | 8/2004 | Vorbach et al. | |
| 2005/0091468 A1 | 4/2005 | Morita et al. | |
| 2005/0108503 A1 | 5/2005 | Sandon et al. | |
| 2005/0160129 A1 | 7/2005 | Endo | |
| 2006/0010306 A1 | 1/2006 | Saito et al. | |
| 2006/0190517 A1 | 8/2006 | Guerrero | |
| 2007/0180172 A1 | 8/2007 | Schmidt et al. | |
| 2007/0186126 A1 | 8/2007 | Smith et al. | |
| 2009/0031089 A1 | 1/2009 | Tuominen | |
| 2009/0113169 A1 | 4/2009 | Yang et al. | |
| 2009/0135739 A1 | 5/2009 | Hoover et al. | |
| 2010/0161309 A1 | 6/2010 | Chartraire et al. | |
| 2010/0268862 A1 | 10/2010 | Park et al. | |
| 2011/0264723 A1 | 10/2011 | Yagain | |
| 2012/0126851 A1 | 5/2012 | Kelem et al. | |
| 2012/0131257 A1 | 5/2012 | Rudosky et al. | |
| 2013/0024621 A1 | 1/2013 | Choi et al. | |
| 2013/0151576 A1 | 6/2013 | Lutz et al. | |
| 2013/0227255 A1 | 8/2013 | Kim | |
| 2013/0326190 A1 | 12/2013 | Chung et al. | |
| 2013/0339564 A1 | 12/2013 | Nogueira et al. | |
| 2014/0040334 A1 | 2/2014 | Burgess et al. | |
| 2014/0149480 A1 | 5/2014 | Catanzaro et al. | |
| 2014/0237227 A1 | 8/2014 | Aizawa | |
| 2014/0317628 A1 | 10/2014 | Kim | |
| 2014/0331031 A1 | 11/2014 | Suh et al. | |
| 2015/0100971 A1 | 4/2015 | Dube et al. | |
| 2015/0347192 A1 | 12/2015 | Blaine et al. | |
| 2016/0012012 A1 | 1/2016 | Yen et al. | |
| 2017/0054449 A1 | 2/2017 | Mani et al. | |
| 2017/0083313 A1 | 3/2017 | Sankaralingam et al. | |
| 2017/0105130 A1 | 4/2017 | Chen et al. | |
| 2017/0123794 A1 | 5/2017 | Chen et al. | |
| 2017/0161204 A1 | 6/2017 | Roberts et al. | |
| 2017/0185564 A1 | 6/2017 | Toichi | |
| 2017/0244982 A1 | 8/2017 | Fuldseth et al. | |
| 2017/0317678 A1 | 11/2017 | Coole et al. | |
| 2017/0322774 A1 | 11/2017 | Zhang | |
| 2017/0322805 A1 | 11/2017 | Zohar et al. | |
| 2018/0089117 A1 | 3/2018 | Nicol | |
| 2018/0121121 A1 | 5/2018 | Mehra et al. | |
| 2018/0143832 A1 * | 5/2018 | Nield | G06F 8/40 |
| 2018/0157465 A1 | 6/2018 | Bittner et al. | |
| 2018/0157825 A1 | 6/2018 | Eksten et al. | |
| 2018/0174022 A1 | 6/2018 | Young | |
| 2018/0189231 A1 | 7/2018 | Fleming, Jr. et al. | |
| 2018/0220144 A1 | 8/2018 | Su et al. | |
| 2018/0246834 A1 | 8/2018 | Catiller | |
| 2018/0275193 A1 | 9/2018 | Rouge et al. | |
| 2018/0285295 A1 | 10/2018 | Abel et al. | |
| 2018/0300181 A1 | 10/2018 | Hetzel et al. | |
| 2018/0329681 A1 | 11/2018 | Zhang et al. | |
| 2018/0349098 A1 | 12/2018 | Manohararajah | |
| 2019/0042513 A1 | 2/2019 | Fleming, Jr. et al. | |
| 2019/0042924 A1 | 2/2019 | Pasca et al. | |
| 2019/0056969 A1 | 2/2019 | Khandros et al. | |
| 2019/0084296 A1 | 3/2019 | Shaul et al. | |
| 2019/0114139 A1 | 4/2019 | Zhang | |
| 2019/0147323 A1 | 5/2019 | Li et al. | |
| 2019/0171604 A1 | 6/2019 | Brewer | |
| 2019/0205734 A1 | 7/2019 | Guntoro | |
| 2019/0213153 A1 | 7/2019 | Pan et al. | |
| 2019/0279075 A1 | 9/2019 | Liu et al. | |
| 2019/0303297 A1 | 10/2019 | Fleming, Jr. et al. | |
| 2019/0317770 A1 | 10/2019 | Sankaralingam et al. | |
| 2019/0384642 A1 | 12/2019 | Bolkhovitin et al. | |
| 2020/0125396 A1 | 4/2020 | Chynoweth et al. | |
| 2020/0159544 A1 | 5/2020 | Shah et al. | |
| 2020/0159692 A1 | 5/2020 | Shah et al. | |
| 2020/0174840 A1 | 6/2020 | Zhao et al. | |
| 2020/0241844 A1 | 7/2020 | Koeplinger et al. | |
| 2020/0241899 A1 | 7/2020 | Al-Aghbari et al. | |
| 2020/0272882 A1 | 8/2020 | Lo | |
| 2020/0326992 A1 | 10/2020 | Jin et al. | |
| 2020/0356523 A1 | 11/2020 | Prabhakar et al. | |
| 2020/0371805 A1 | 11/2020 | Lutz | |
| 2021/0011770 A1 | 1/2021 | Prabhakar et al. | |
| 2021/0034982 A1 | 2/2021 | Sather et al. | |
| 2021/0042259 A1 | 2/2021 | Koeplinger et al. | |
| 2021/0055940 A1 | 2/2021 | Shah et al. | |
| 2021/0064341 A1 | 3/2021 | Kuo et al. | |
| 2021/0064372 A1 | 3/2021 | Sun et al. | |
| 2021/0064568 A1 | 3/2021 | Wang et al. | |
| 2021/0072955 A1 | 3/2021 | Mellempudi et al. | |
| 2021/0081691 A1 | 3/2021 | Chen et al. | |
| 2021/0081769 A1 | 3/2021 | Chen et al. | |
| 2021/0089343 A1 | 3/2021 | Hyoudou | |
| 2021/0096816 A1 | 4/2021 | Wang et al. | |
| 2021/0149634 A1 | 5/2021 | Wang et al. | |
| 2021/0157550 A1 | 5/2021 | Wang et al. | |
| 2021/0182021 A1 | 6/2021 | Wang et al. | |

FOREIGN PATENT DOCUMENTS

| | | |
|---|---|---|
| EP | 0733234 A1 | 9/1996 |
| EP | 1372084 A2 | 12/2003 |
| JP | 2020112901 A | 7/2020 |
| TW | 200801964 A | 1/2008 |
| TW | 200928736 A | 7/2009 |
| TW | 201346758 A | 11/2013 |
| TW | 201610708 A | 3/2016 |
| WO | 2010142987 A1 | 12/2010 |
| WO | 2014070055 A1 | 5/2014 |
| WO | 2018/100920 A1 | 6/2018 |

(56) References Cited

FOREIGN PATENT DOCUMENTS

| | | |
|---|---|---|
| WO | 2021067318 A1 | 4/2021 |
| WO | 2021108328 A1 | 6/2021 |

OTHER PUBLICATIONS

Torresen et al., Partial Reconfiguration Applied in an On-line Evolvable Pattern Recognition System, NORCHIP 2008, IEEE, dated Nov. 16, 2008, 4 pages.
Venieris et al., fpgaConvNet: A Framework for Mapping Convolutional Neural Networks on FPGAs, 2016 IEEE 24th Annual International Symposium on Field-Programmable Custom Computing Machines (FCCM), dated May 1, 2016, 8 pages.
Lie et al., Dynamic partial reconfiguration in FPGAs, 2009 IITA, Third International Symposium on Intelligent Information Technology Application, dated Nov. 21, 2009, 4 pages.
U.S. Appl. No. 16/239,252—Response to Office Action dated Aug. 7, 2019, filed Sep. 26, 2019, 6 pages.
CN 2020800135801—Voluntary Amendments with translation, dated Jan. 3, 2022, 16 pages.
EP 20702339.8 Response to Rules 161(1) and 162 Communication, filed Feb. 25, 2022, 10 pages.
TW 108142191—Response to First Office Action dated Nov. 3, 2021, filed Jan. 26, 2022, 9 pages.
TW 108142191—Notice of Allowance, dated Feb. 21, 2022, 2 pages.
U.S. Appl. No. 17/093,543—Response to Office Action dated Oct. 12, 2021, filed Jan. 20, 2022, 4 pages.
CA 3120683—Response to First Office Action dated Sep. 1, 2021, filed Dec. 31, 2021, 4 pages.
EP 198213613—Response to Rules 161(1) and 162 Communication dated Jul. 1, 2021, filed Jan. 11, 2022, 12 pages.
EP 19829712.9—Rules 161(1) and 162 Communication, dated Jun. 30, 2021, 3 pages.
EP 19829712.9—Response to Rules 161(1) and 162 Communication dated Jun. 30, 2021, filed Jan. 10, 2022, 11 pages.
U.S. Appl. No. 16/862,445 Response to Office Action dated Mar. 18, 2021, filed Jun. 9, 2021, 12 pages.
U.S. Appl. No. 16/198,086—Notice of Allowance (after RCE) dated Jun. 28, 2021, 9 pages.
PCT/US2019/062287 International Preliminary Report on Patentability, dated Feb. 19, 2021, 31 pages.
PCT/US2019/062289—International Preliminary Report on Patentability dated Feb. 19, 2021, 27 pages.
PCT/US2020/012079—Second Article 34 Amendment (Response to Informal Communication by Telephone) dated Feb. 2, 2021, as filed on Apr. 2, 2021, 5 pages.
CA 3120683—First Office Action dated Sep. 1, 2021, 3 pages.
U.S. Appl. No. 16/862,445 Notice of Allowance, dated Sep. 17, 2021, 15 pages.
TW 108142191—First Office Action dated, Nov. 3, 2021, 17 pages.
EP 207029398 Rules 161(1) and 162 Communication, dated Aug. 18, 2021, 3 pages.
CA 3120683 Voluntary Amendments, dated Aug. 4, 2021, 9 pages.
EP 198213613 Rules 161(1) and 162 Communication, dated Jul. 1, 2021, 3 pages.
U.S. Appl. No. 16/239,252 Final Office Action, dated Jan. 8, 2020, 13 pages.
Podobas et al, A Survey on Coarse-Grained Reconfigurable Architectures From a Performance Perspective, IEEEAccess, vol. 2020. 3012084, Jul. 27, 2020, 25 pages.
Benoit et al: "Automatic Task Scheduling/ Loop Unrolling using Dedicated RTR Controllers in Coarse Grain Reconfigurable Architectures", Parallel and Distributed Processing Symposium, 2005. Proceedings. 19th IEEE International Denver, CO, USA Apr. 4-8, 2005, Piscataway, NJ, USA,IEEE, Apr. 4, 2005 (Apr. 4, 2005), pp. 148a-148a, XP010785667, DOI: 10.1109/IPDPS.2005.119, ISBN: 978-0-7695-2312-5, 8 pages.

PCT/US2020/040832—International Search Report and the Written Opinion dated Sep. 18, 2020, 18 pages.
TW 109102852—Office Action dated Jan. 30, 2020, 6 pages.
U.S. Office Action from U.S. Appl. No. 16/504,627 dated Feb. 12, 2021, 10 pages.
U.S. Appl. No. 16/862,445—Office Action dated Mar. 18, 2021, 25 pages.
Wentzlaff et al: "On-Chip Interconnection Architecture of the Tile Processor", IEEE Micro, IEEE Service Center, Los Alamitos, CA, US, vol. 27, No. 5, Sep. 1, 2007 (Sep. 1, 2007), pp. 15-31, XP011196754.
U.S. Appl. No. 16/198,086—Notice of Allowance dated Jan. 15, 2021, 23 pages.
TW 109102852 Voluntary Amendment, dated Jul. 10, 2020, 19 pages.
TW 109102852 First Office Action, dated Jul. 29, 2020, 30 pages.
TW 109102852 Response to First Office Action, dated Jul. 29, 2020, 70 pages.
TW 109102852 Notice of Allowance, dated Nov. 6, 2020, 3 pages.
PCT-US2020-012079 International Preliminary Report on Patentability, dated May 7, 2021, 14 pages.
PCT 2020045478 International Search Report and Written Opinon dated Nov. 17, 2020, 14pages.
Fricke, et al., "Automatic Tool Flow for Mapping Applications to an Application Specific CGRA Architecture", dated May 20, 2019, 8 pages.
Srivasatva, et. al., "T2S Tensor Productively Generating High Performance Spatial Hardware for Dense Tensor Computations", Apr. 28, 2019, 9 pages.
Koeplinger, et.al., "Automatic Generation of Efficient Accelerators for Reconfigurable Hardware", 2016, 13 pages.
Fiszel, Rubin, et. al., "Accelerated Sensor Fusion for Drones and a Simulation Framework for Spatial", Aug. 17, 2017, 106 pages.
Arvind, A. et. al., "Executing a Program on the MIT Tagged-Token Dataflow", 1987, 29 pages.
Arvind, A, et. al., "I-Structures: Data Structures for Parallel Computing", 1989, 45 pages.
Dennis, "A Data Flow Retrospective How It All Began", 2005, 32 pages.
Arvind, A, "Dataflow: Passing the Token", Jun. 6, 2005, 42 pages.
Culler, David E., et. al., "Resource Requirements of Dataflow Programs", 1988, 10 pages.
Bendersky "The Softmax function and its derivative," https://eli.thegreenplace.net/2016/the-softmax-function-and-its-derivative, Oct. 18, 2016, 11 pages.
Cook, "Comparing bfloat16 range and precision to other 16-bit numbers," www.johndcook.com/blog/2018/11/15/bfloat16, downloaded on Nov. 15, 2018, 4 pages.
Intel BLOAT16—Hardware Numerics Definition White Paper, Rev. 1.0, Nov. 2018, 7 pages.
Ioffe, et al., "Batch Normalization: Accelerating Deep Network Training by Reducing Internal Covariate Shift," Cornell University, available at https://arxiv.org/abs/1502.03167, Mar. 2, 2015, 11 pages.
Petersen, "Softmax with cross-entropy," https://mattpetersen.github.io/softmax-with-cross-entropy, Jun. 25, 2017, 19 pages.
Wikipedia "bfloat16 floating-point format," downloaded Aug. 19, 2019, 2 pages.
Wikipedia "Floor and ceiling functions," downloaded Aug. 12, 2019, 5 pages.
U.S. Office Action in U.S. Appl. No. 16/688,069 dated Jan. 29, 2021, 18 pages.
Iqbal, "Reconfigurable Processor Artchitecture for High Speed Applications," IEEE Int'l Advance Computing Conference (IACC 2009), Patiala, India, Mar. 6-7, 2009, 6 pages.
Olukotun, "Designing Computer Sytems for Software 2.0," ISCA 2018 keynote, Jun. 2018, 49 pages.
Kumar, Pasupuleti Sirish et al,"Low Complex & High Accuracy Computation Approximations to Enable On-Device RNN Applications", 2019 IEEE International Symposium On Circuits and Systems (ISCAS), IEEE, May 26, 2019 (May 26, 2019), pp. 1-5.
PCT/US2020/49285—International Search Report and Written Opinion dated Nov. 18, 2020, 13 pages.

(56) References Cited

OTHER PUBLICATIONS

PCT/US2020/061862—International Search Report and Written Opinion dated Mar. 10, 2021, 11 pages.
Wikipedia "Batch normalization," downloaded Feb. 25, 2021, 10 pages.
U.S. Appl. No. 16/695,138—Non-Final Office Action dated Apr. 22, 2021, 11 pages.
U.S. Appl. No. 16/590,058—Office Action dated Jun. 1, 2021, 9 pages.
U.S. Office Action in U.S. Appl. No. 16/688,069 dated Jun. 3, 2021, 9 pages.
Anonymous: "Rounding to 0.5", Arduino Forum, Aug. 28, 2017, 14 pages.
PCT/US2020/062905—International Search Report and Written Opinion dated Mar. 22, 2021, 14 pages.
MISB ST 1201.4, "Floating Point to Integer Mapping," Feb. 28, 2019, pp. 1-21.
Agrawal, et al., "DLFloat: A 16 b Floating Point format designed for Deep Learning Training and Inference", 2019, 4pgs.
Burgess, et al, "Bfloat16 processing for Neural Networks", 2019, 4pgs.
Johnson, et al, "Rethinking Floating Point for Deep Learning", Nov. 1, 2018, 8pgs.
Cambier,et al, Shifted and Squeezed 8 Bit Floating Point Format For Low Precision Training Of Deep Neural Networks, Jan. 16, 2020, 12pgs.
Kalamkar, et al, "A Study of bfloat16 for Deep Learning Training", Jun. 13, 2019, 10pgs.
Hagiescu, et al, "bfloat MLP Training Accelerator for FPGAs", 2019, 5pgs.
LeCun, et al, "Deep Learning Hardware Past, Present, and Future", 2019, 8pgs.
Henry, et al, "Leveraging the bfloat16 Artificial Intelligence Datatype for Higher Precision Computations", 2019, 8pgs.
Ericles, Sousa, et. al. "A Reconfigurable Memory Architecture for System Integration of Coarse-Grained Reconfigurable Arrays", 2017 International Conference on ReConFigurable Computing and FPGAs, Dec. 4-6, 2017, 8 pages.
U.S. Appl. No. 17/127,929—Office Action dated Apr. 1, 2021, 26 pages.
Kachris et al.; "A Survey on Reconfigurable Accelerators for Cloud Computing", IEEE 2016, Aug. 29, 2016, pp. 1-11.
Knodel, Oliver, et. al., "RC3E: Reconfigurable Accelerators in Data Centers and their Provision by Adapted Service Models", IEEE 9th International Converence on Cloud Computing, 2016, pp. 1-8.
Marshall, Dave, "Remote Procedure Calls (RPC)", Jan. 5, 1999, 15 pages, Retreived from URL <https://users.cs.cf.ac.uk/Dave.Marshall/C/node33.html#S ECTION 003300000000000000000>.
Li, Ang, et. al., "Evaluating Modern GPU Interconnect PCIe, NVLink, NV-SLI, NVSwitch and GPUDirect", Mar. 11, 2019, 15 pages.
Nvidia, "Nvidia Tesla P100", WP-08019-001 v01.1, 2016, 45 pages.
Nvidia, "Nvidia DGX-1 System Architecture", WP-08437-001_v02, 2017, 33 pages.
Nvidia, "Nvidia Turing GPU Architecture", WP-09183-001_v01, 2018, 86 pages.
Nvidia, "Nvidia DGX-1 With Tesla V100 System Architecture", WP-08437-002_v01, 2017, 43 pages.
Jackson et. al., PCI Express Technology Comprehensive Guide to Generation 1.x, 2.x and 3.0, dated Jun. 2020, 1057 pages.
Tanaka et. al., Distributed Deep Learning with GPU-FPGA heterogenous computing, IEEE 2021, 9 pages.
Insujang, GPU Architecture Overview, Better Tomorrow with Computer Science, published Apr. 27, 2017, retrieved on Jun. 17, 2021, retrieved from the Internet [ URL: https://insujang.github.io/2017-04-17/gpu-architecture-overview/].
Ruder, An overview of gradient descent optimization algorithms, NUI Galway Aylien Lyd, dated Jun. 15, 2017, 14 pages.
Zhang et. al., Dive into Deep Learning, Release 0.16.2, dated Mar. 20, 2021, 1027 pages.
Xiandong Qi, Introduction to Distributed Deep Learning, dated May 13, 2017, 13 pages.
Woolloy, NCCL: Accelerated Multi-GPU Collective Communications, Nvidia, 56 pages.
Lecture 11: Distributed Training and Communication Protocols, CSE599W: Spring 2018, UW Paul G. Allen School of Computer Science and Engineering, 41 pages.
Accelerated Computing with a Reconfigurable Dataflow Architecture, SambaNova Systems Whitepaper, 10 pages.
Goodfellow et. al., Deep Learning Book Chapter 6 Deep Feedforward Networks, 2016, 60 pages.
Strom, Scalable Distributed DNN Training Using Commodity GPU Cloud Computing, Amazon.com, 5 pages.
Mao, Data Parallelism vs Model Parallelism in Distributed Deep Learning Training, dated Mar. 23, 2019, 4 pages, retrieved on Mar. 30, 2021, Retrieved from the internet [ URL: https://leimao.github.io].
Donges, Gradient Descent: An Introduction to Machine Learning's Most Popular Algorithms, dated Jun. 16, 2019, 10 pages. Retrieved on Mar. 24, 2021, retrieved from [URL: https://builtin.com/data-science/gradient-descent].
Jin et. al., Howto scale distributed deep learning, dated Nov. 14, 2016, 16 pages.
U.S. Appl. No. 17/127,818—Office Action dated Apr. 1, 2021, 15 pages.
M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.
Prabhakar et al., "Plasticine: A Reconfigurable Architecture for Parallel Patterns", ISCA '17, Jun. 24-24, 2017, Toronto ON, Canada.
Koeplinger et. al., Spatial: A Language and Compiler for Application Accelerators, Proceedings of the 39th ACM SIGPLAN Conference On Programming Language Design And Embodiment (PLDI), Proceedings of the 43rd International Symposium on Computer Architecture, 2018.
Paek et al., "Binary Acceleration Using Coarse-Grained Reconfigurable Architecture," ACM SIGARCH Computer Architecture News, vol. 38, No. 4, Sep. 2010, 7 pages.
Vadivel et al., "Loop Overhead Reduction Techniques for Coarse Grained Reconfigurable Architectures," ResearchGate, Conference Paper, Aug. 2017, https://www.researchgate.net/publication/319416458, 9 pages.
Zhang, "Design of Coarse-Grained Reconfigurable Architecture for Digital Signal Processing," Implementation Aspects, Master of Science Thesis, Feb. 2009, 110 pages.
Nicol, "A Course Grain Reconfigurable Array (CGRA) for Statically Scheduled Data Flow Computing," Wave Computing, May 3, 2017, 9 pages.
Harris et al., "Architectures and Algorithms for User Customization of CNNs," ASP-DAC 2018, 32 pages.
De Sutter et al., "Coarse-Grained Reconfigurable Array Architectures," 2010 Handbook of Signal Processing Systems, 37 pages.
Nicol, "Wave Computing: A Dataflow Processing Chip for Training Deep Neural Networks," 2017, 25 pages.
Ando et al., "A Multithreaded CGRA for Convolutional Neural Network Processing," Scientific Research Publishing, Circuits and Systems, Jun. 2017, pp. 149-170.
Tanomoto et al., "A CGRA-based Approach for Accelerating Convolutional Neural Networks," 2015 IEEE 9th International Symposium on Embedded Multicore/Many-core Systems-on-Chip, 2015, pp. 73-80.
Li, et al., "CATERPILLAR: Coarse Grain Reconfigurable Architecture for Accelerating the Training of Deep Neural Networks," arXiv: 1706.00517v2 [cs.DC], Jun. 8, 2017, 10 pages.
Wijtvliet, Course Syllabus for "Accelerators and Coarse Grained Reconfigurable Architectures," Advanced School for Computing and Imaging, 2017, 2 pages.
Hartenstein, "Coarse Grain Reconfigurable Architectures," IEEE, 2001, 6 pages.
Wang, et al., "Reconfigurable Hardware Accelerators: Opportunities, Trends and Challenges," Cornell University, Dec. 13, 2017, 25 pages.

(56) References Cited

OTHER PUBLICATIONS

Vranjkovic et al., "Coarse-Grained Reconfigurable Hardware Accelerator of Machine Learning Classifiers," IWSSIP 2016, The 23rd International Conference on Systems, Signals and Image Processing, May 23-25, 2016, Bratislava, Slovakia, 5 pages.
Wijtvliet et al., "Coarse Grained Reconfigurable Architectures in the Past 25 Years: Overview and Classification," IEEE 2016, pp. 235-244.
Fiolhais et al., "Overlay Architectures for Space Applications," SpacE FPGA Users Workshop, Apr. 9-11, 2018, pp. 1-20.
Anonymous, Activation Function, Wikipedia, Retrieved on Aug. 16, 2019, 3 pages. Retrieved from [ URL: https://en.wikipedia.org/wiki/Activation_function ].
AMBA AXI and ACE Protocol Specification, ARM, as early as Jan. 2003, 440 pages.
Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.
Eppler et al. ,"High speed neural network chip for trigger purposes in high energy physics," IEEE, Proc. of the conference on design, automation and test in Europe, Feb. 1998, 8 pages.
Gomar et al. "Precise digital implementations of hyperbolic tanh and sigmoid function," 2016 50th Asilomar Conference on Signals, Systems and Computers, Nov. 6-9, 2016, 4 pages.
Iannucci, "Toward a dataflow/von Neumann hybrid architecture," ISCA '88 Proc. of the 15th Annual ISCA, May 30-Jun. 2, 1988, 10 pages.
Lin et al., "A Digital Circuit Design of Hyperbolic Tangent Sigmoid Function for Neural Networks," 2018 IEEE Int'l Symp. on Circuits and Systems, May 18-21, 2018, 4 pages.
Turkson et al. "Artificial neural network applications in the calibration of spark-ignition engines: An overview," Engineering Science and Technology, an International Journal, vol. 19, Issue 3, Sep. 2016, 1346-1359.
U.S. Office Action from U.S. Appl. No. 16/260,548 dated Dec. 26, 2019, 9 pages.
PCT/US2019/062287—International Search Report and Written Opinion dated Feb. 5, 2020, 18 pages.
U.S. Appl. No. 16/260,548—Notice of Allowance dated Apr. 29, 2020, 15 pages.
Tobuschat, et al., "IDAMC: A NoC for mixed criticality systems," 2013 IEEE 19th International Conference on Embedded and Real-Time Computing Systems and Applications, Taipei, Aug. 19-21, 2013, pp. 149-156.
PCT/US2020/012079—International Search Report and Written Opinion dated Apr. 29, 2020, 18 pages.
Jafri et al., "NeuroCGRA: A CGRAs with Support for Neural Networks," 2014 International Conference on High Performance Computing & Simulation (HPCS), 8 pages.
U.S. Appl. No. 16/239,252—Office Action dated Aug. 7, 2019, 8 pages.
U.S. Appl. No. 16/239,252—Response to Final Office Action dated Jan. 8, 2020, filed Jan. 24, 2020, 14 pages.
U.S. Appl. No. 16/239,252—Notice of Allowance dated Feb. 12, 2020, 10 pages.
U.S. Appl. No. 16/239,252—Notice of Allowance dated May 14, 2020, 15 pages.
U.S. Office Action from U.S. Appl. No. 16/407,675 dated May 18, 2020, 9 pages.
U.S. Appl. No. 16/197,826—Notice of Allowance dated May 18, 2020, 22 pages.
PCT/US2019/062289—International Search Report and Written Opinion dated Feb. 28, 2020, 14 pages.
PCT/US2020/014652—International Search Report and Written Opinion dated May 26, 2020, 9 pages.
TW 108148376—Notice of Allowance dated Oct. 23, 2020, 5 pages.
TW 108148376—Request for Exam and Voluntary Amendment filed Jun. 30, 2020, 17 pages.
U.S. Office Action from U.S. Appl. No. 16/407,675 dated Oct. 29, 2020, 7 pages.
U.S. Office Action from U.S. Appl. No. 16/504,627 dated Nov. 13, 2020, 8 pages.
PCT/US2020/012079 Response to Chapter II Demand, Nov. 3, 2020, 25 pages.
U.S. Appl. No. 16/197,826—Notice of Allowance dated Jun. 29, 2020, 11 pages.
PCT/US2019/062287—Response to Chapter II, dated Sep. 1, 2020, 17pgs.
PCT/US2019/062289 - Response to Chapter II Demand, Nov. 15, 2020, 11 pages (SBNV-1001-2B).
PCT/US2020/32186—International Search Report and Written Opinion dated Aug. 14, 2020; 21 pages.
80.192.25.230: "Producer-consumer problem", Feb. 7, 2013 (Feb. 7, 2013), XP055530821, Retrieved from the Internet: URL:https://en.wikipedia.org/w/index.php?t>itle=Producer%E2%80%93consumer_problem&oldid=537111527[retrieved on Dec. 6, 2018], 4 pages.

* cited by examiner

RUNTIME PATCHING OF CONFIGURATION FILES

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," *Proceedings Of The 39th ACM SIGPLAN Conference On Programming Language Design And Embodiment* (PLDI), Proceedings of the 43rd International Symposium on Computer Architecture, 2018;

U.S. Nonprovisional patent application Ser. No. 16/239,252, filed Jan. 3, 2019, entitled, "VIRTUALIZATION OF A RECONFIGURABLE DATA PROCESSOR,";

U.S. Nonprovisional patent application Ser. No. 16/197,826, filed Nov. 21, 2018, entitled, "CONFIGURATION LOAD OF A RECONFIGURABLE DATA PROCESSOR,";

U.S. Nonprovisional patent application Ser. No. 16/198,086, filed Nov. 21, 2018, entitled, "CONFIGURATION UNLOAD OF A RECONFIGURABLE DATA PROCESSOR,";

U.S. Nonprovisional patent application Ser. No. 16/260,548, filed Jan. 29, 2019, entitled, "MATRIX NORMAL/TRANSPOSE READ AND A RECONFIGURABLE DATA PROCESSOR INCLUDING SAME,";

U.S. Nonprovisional patent application Ser. No. 16/536,192, filed Aug. 8, 2019, entitled, "COMPILER FLOW LOGIC FOR RECONFIGURABLE ARCHITECTURES,";

U.S. Nonprovisional patent application Ser. No. 16/407,675, filed May 9, 2019, entitled, "CONTROL FLOW BARRIER AND RECONFIGURABLE DATA PROCESSOR,";

U.S. Nonprovisional patent application Ser. No. 16/504,627, filed Jul. 8, 2019, entitled, "QUIESCE RECONFIGURABLE DATA PROCESSOR,";

U.S. Nonprovisional patent application Ser. No. 16/572,516, filed Sep. 16, 2019, entitled, "EFFICIENT EXECUTION OF OPERATION UNIT GRAPHS ON RECONFIGURABLE ARCHITECTURES BASED ON USER SPECIFICATION,";

U.S. Nonprovisional patent application Ser. No. 16/744,077, filed Jan. 15, 2020, entitled, "COMPUTATIONALLY EFFICIENT SOFTMAX LOSS GRADIENT BACKPROPAGATION,";

U.S. Nonprovisional patent application Ser. No. 16/590,058, filed Oct. 1, 2019, entitled, "COMPUTATION UNITS FOR FUNCTIONS BASED ON LOOKUP TABLES,";

U.S. Nonprovisional patent application Ser. No. 16/695,138, filed Nov. 25, 2019, entitled, "COMPUTATION UNITS FOR BATCH NORMALIZATION,";

U.S. Nonprovisional patent application Ser. No. 16/688,069, filed Nov. 19, 2019, entitled, "LOOK-UP TABLE WITH INPUT OFFSETTING,";

U.S. Nonprovisional patent application Ser. No. 16/718,094, filed Dec. 17, 2019, entitled, "COMPUTATION UNITS FOR ELEMENT APPROXIMATION,";

U.S. Nonprovisional patent application Ser. No. 16/560,057, filed Sep. 4, 2019, entitled, "SIGMOID FUNCTION IN HARDWARE AND A RECONFIGURABLE DATA PROCESSOR INCLUDING SAME,";

U.S. Nonprovisional patent application Ser. No. 16/572,527, filed Sep. 16, 2019, entitled, "PERFORMANCE ESTIMATION-BASED RESOURCE ALLOCATION FOR RECONFIGURABLE ARCHITECTURES,";

U.S. Nonprovisional patent application Ser. No. 15/930,381, filed May 12, 2020, entitled, "COMPUTATIONALLY EFFICIENT GENERAL MATRIX-MATRIX MULTIPLICATION (GeMM),";

U.S. Nonprovisional patent application Ser. No. 16/890,841, filed Jun. 2, 2020, entitled, "ANTI-CONGESTION FLOW CONTROL FOR RECONFIGURABLE PROCESSORS,"; and U.S. Nonprovisional patent application Ser. No. 16/922,975, filed Jul. 7, 2020, entitled, "RUNTIME VIRTUALIZATION OF RECONFIGURABLE DATA FLOW RESOURCES,".

FIELD OF THE TECHNOLOGY DISCLOSED

The present technology relates to runtime patching of configuration files, which can be particularly applied to coarse-grained reconfigurable architectures (CGRAs).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

A key strength of reconfigurable processors is the ability to modify their operation at runtime, as well as the ease with which they can be safely partitioned for sharing. Reconfigurable processors, including field programmable gate arrays (FPGAs), can be configured to implement a variety of functions more efficiently or faster than might be achieved using a general purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Configuration of reconfigurable processors involves compilation of a configuration description to produce a configuration file, referred to sometimes as a bitstream or bit file, and distributing the configuration file to the configurable units on the processor. To start a process, the configuration file must be loaded for that process. To modify the process, the configuration file must be modified with updated configuration state.

The procedures and supporting structures for loading updates to the configuration files can be complex, and the execution of the procedures can be time consuming.

In order to maximize operating efficiency and be able to swap updates on a reconfigurable processor, a means of efficiently loading the updated configuration state is needed.

SUMMARY

A technology is described which enables runtime patching of configuration files in Coarse-Grained Reconfigurable Array processors that contain programmable elements in an array partitionable into subarrays, and other types of reconfigurable processors.

A data processing system is described. The data processing system comprises a pool of reconfigurable data flow resources. Reconfigurable data flow resources in the pool of reconfigurable data flow resources include arrays of configurable units. The data processing system further comprises a host. The host is operatively coupled to the pool of reconfigurable data flow resources and configured with runtime logic to receive a plurality of configuration files for applications, and metadata specifying modifications to configuration files in the plurality of configuration files, to modify the configuration files based on the metadata to generate modified configuration files, and to load and execute the modified configuration files on the arrays of configurable units.

In one implementation, the runtime logic modifies the configuration files based on the metadata N times to generate the modified configuration files, and iteratively loads and executes the modified configuration files on the arrays of configurable units M times. In some implementations, M>>N.

In one implementation, the modifications include updates to argument data in the configuration files. The argument data specifies execution parameters of the applications. In some implementations, the metadata identifies locations of the argument data in the configuration files.

In another implementation, the modifications include updates to memory mapping data in the configuration files. The memory mapping data translates virtual addresses of virtual data flow resources specified in the configuration files to physical addresses of the reconfigurable data flow resources allocated to the virtual data flow resources.

In one implementation, the configuration files contain bit streams, and the modifications include changing bits in the bit streams.

In one implementation, the host has host memory. In some implementations, the runtime logic stores the modified configuration files in the host memory. In one implementation, the reconfigurable data flow resources include processor memory. In some implementations, the runtime logic loads the modified configuration files from the host memory onto the processor memory. In one implementation, the runtime logic loads the modified configuration files from the processor memory onto the arrays of configurable units for execution.

In one implementation, the configuration files are generated by a compiler running in the host.

In another implementation, a data processing system is described that comprises a pool of reconfigurable data flow resources. Reconfigurable data flow resources in the pool of reconfigurable data flow resources include arrays of configurable units and processor memory. The data processing system further comprises a host. The host is operatively coupled to the pool of reconfigurable data flow resources and has host memory. The host is configured with runtime logic to receive a plurality of configuration files for applications, and metadata specifying modifications to configuration files in the plurality of configuration files, to load the configuration files on the processor memory, to modify the configuration files loaded on the processor memory based on the metadata to generate modified configuration files, and to load and execute the modified configuration files on the arrays of configurable units.

In yet another implementation, a data processing system is described that comprises a pool of reconfigurable data flow resources. Reconfigurable data flow resources in the pool of reconfigurable data flow resources include arrays of configurable units and a runtime processor. The runtime processor is configured with runtime logic to receive a plurality of configuration files for applications, and metadata specifying modifications to configuration files in the plurality of configuration files, to modify the configuration files based on the metadata to generate modified configuration files, and to load and execute the modified configuration files on the arrays of configurable units.

In one implementation, a system is described that comprises an array of configurable units. The system also comprises a runtime logic. The runtime logic is configured to modify a plurality of configuration files for applications to generate modified configuration files. Configuration files in the plurality of configuration files are generated as a result of compiling the applications. The configuration files include configuration data for configuring configurable units in the array of configurable units to run the applications. The runtime logic is further configured to load and execute the modified configuration files on the configurable units in the array of configurable units.

In one implementation, the runtime logic modifies the configuration files based on the metadata N times to generate the modified configuration files, and iteratively loads and executes the modified configuration files on the arrays of configurable units M times. In some implementations, M>>N.

In one implementation, the modifications include updates to argument data in the configuration files. The argument data specifies execution parameters of the applications. In some implementations, the metadata identifies locations (e.g., offsets) of the argument data in the configuration files.

In another implementation, the modifications include updates to memory mapping data in the configuration files. The memory mapping data translates virtual addresses of virtual data flow resources specified in the configuration files to physical addresses of the reconfigurable data flow resources allocated to the virtual data flow resources.

In one implementation, the configuration files contain bit streams, and the modifications include changing bits in the bit streams.

In one implementation, a computer-implemented method is described. The method includes accessing a plurality of configuration files for applications, and metadata specifying modifications to configuration files in the plurality of configuration files. Configuration files in the plurality of configuration files are generated as a result of compiling the applications. The configuration files include configuration data for configuring configurable units in the array of configurable units to run the applications. The runtime logic is further configured to load and execute the modified configuration files on the configurable units in the array of configurable units. The method further includes modifying the configuration files based on the metadata to generate modified configuration files. The method further includes loading and executing the modified configuration files on configurable units in the arrays of configurable units.

In another implementation, a computer-implemented method is described. The method includes modifying a plurality of configuration files for applications to generate modified configuration files. Configuration files in the plurality of configuration files are generated as a result of compiling the applications. The configuration files include configuration data for configuring configurable units in an array of configurable units to run the applications. The method further includes loading and executing the modified configuration files on the configurable units in the array of configurable units.

One or more implementations of the technology disclosed or elements thereof can be implemented in the form of a computer product including a non-transitory computer readable storage medium with computer usable program code for performing the method steps indicated. Furthermore, one or more implementations of the technology disclosed or elements thereof can be implemented in the form of an apparatus including a memory and at least one processor that is coupled to the memory and operative to perform exemplary method steps. Yet further, in another aspect, one or more implementations of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects, and advantages of the technology disclosed will become apparent from the following detailed description of illustrative implementations thereof, which is to be read in connection with the accompanying drawings.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 10B illustrates an example switch unit connecting elements in an array level network.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Figure 1:
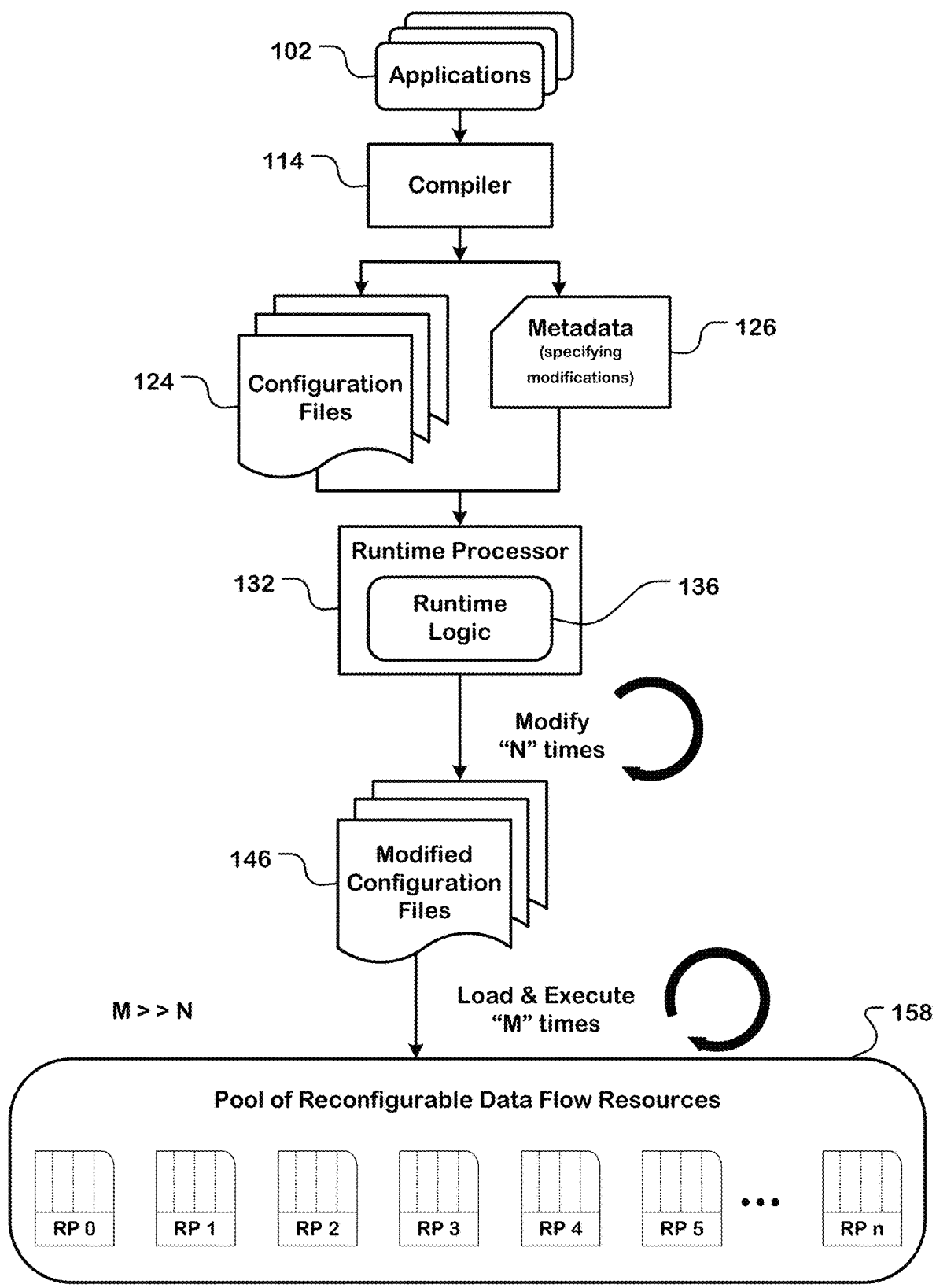
FIG. 1 shows one implementation of runtime patching of configuration files, according to the technology disclosed.

FIG. 1 shows one implementation of runtime patching of configuration files 124, according to the technology disclosed. Reconfigurable data flow resources in the pool of reconfigurable data flow resources 158 include reconfigurable processors. A reconfigurable processor includes an array of configurable units (e.g., compute units and memory units) in a programmable interconnect fabric. The array of configurable units in a reconfigurable processor is partitionable into a plurality of subarrays (or tiles) of configurable units. Additional details about the architecture of the reconfigurable processors are discussed later in using FIGS. 8, 9, 10, 10B, 11, and 12.

The pool of reconfigurable data flow resources 158 also includes bus resources (or transfer resources). Examples of the bus resources include PCIe channels, DMA channels, and DDR channels. The pool of reconfigurable data flow resources 158 also includes memory resources (or storage resources). Examples of the memory resources include main memory (e.g., off-chip/external DRAM), local secondary storage (e.g., local disks (e.g., HDD, SSD)), and remote secondary storage (e.g., distributed file systems, web servers). Other examples of the memory resources include latches, registers, and caches (e.g., SRAM). The pool of reconfigurable data flow resources 158 is dynamically scalable to meet the performance objectives required by applications 102 (or user applications 102). The applications 102 access the pool of reconfigurable data flow resources 158 over one or more networks (e.g., Internet).

In some implementations, different compute scales and hierarchies form the pool of reconfigurable data flow resources 158 according to different implementations of the technology disclosed. In one example, the pool of reconfigurable data flow resources 158 is a node (or a single machine) that runs a plurality of reconfigurable processors, supported by required bus and memory resources. The node also includes a host processor (e.g., CPU) that exchanges data with the plurality of reconfigurable processors, for example, over a PCIe interface. The host processor includes a runtime processor that manages resource allocation, memory mapping, and execution of the configuration files for applications requesting execution from the host processor. In another example, the pool of reconfigurable data flow resources 158 is a rack (or cluster) of nodes, such that each node in the rack runs a respective plurality of reconfigurable processors, and includes a respective host processor configured with a respective runtime processor. The runtime processors are distributed across the nodes and communicate with each other so that they have unified access to the reconfigurable processors attached not only to their own node on which they run, but also to the reconfigurable processors attached to every other node in the data center.

The nodes in the rack are connected, for example, over Ethernet or InfiniBand (IB). In yet another example, the pool of reconfigurable data flow resources 158 is a pod that comprises a plurality of racks. In yet another example, the pool of reconfigurable data flow resources 158 is a superpod that comprises a plurality of pods. In yet another example, the pool of reconfigurable data flow resources 158 is a zone that comprises a plurality of superpods. In yet another example, the pool of reconfigurable data flow resources 158 is a data center that comprises a plurality of zones.

The applications 102 are executed on the reconfigurable processors in a distributed fashion by programming the individual compute and memory components to asynchronously receive, process, and send data and control information. In the reconfigurable processors, computation can be executed as deep, nested dataflow pipelines that exploit nested parallelism and data locality very efficiently. These dataflow pipelines contain several stages of computation, where each stage reads data from one or more input buffers with an irregular memory access pattern, performs computations on the data while using one or more internal buffers to store and retrieve intermediate results, and produces outputs that are written to one or more output buffers. The structure of these pipelines depends on the control and dataflow graph representing the application. Pipelines can be arbitrarily nested and looped within each other.

The applications 102 comprise high-level programs. A high-level program is source code written in programming languages like C, C++, Java, JavaScript, Python, and Spatial, for example, using deep learning frameworks like PyTorch, TensorFlow, ONNX, Caffe, and Keras. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL. In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

Regarding loops in the high-level programs of the applications 102, loops directly nested in a loop body are termed the child loops of the outer parent loop. A loop is called an innermost loop if it does not have any children, i.e., there are no nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

In some implementations, a software development kit (SDK) generates computation graphs (e.g., data flow graphs, control graphs) of the high-level programs of the applications 102. The SDK transforms the input behavioral description of the high-level programs into an intermediate representation such as the computation graphs. This may include code optimization steps like false data dependency elimination, dead-code elimination, and constant folding. The computation graphs encode the data and control dependencies of the high-level programs.

The computation graphs comprise nodes and edges. The nodes can represent compute operations and memory allocations. The edges can represent data flow and control flow. In some implementations, each loop in the high-level programs can be represented as a "controller" in the computation graphs. The computation graphs support branches, loops, function calls, and other variations of control dependencies. In some implementations, after the computation graphs are generated, additional analyses or optimizations focused on loop transformations can be performed, such as loop unrolling, loop pipelining, loop fission/fusion, and loop tiling.

The SDK also supports programming the reconfigurable processors in the pool of reconfigurable data flow resources 158 at multiple levels, for example, from the high-level deep learning frameworks to C++ and assembly language. In some implementations, the SDK allows programmers to develop code that runs directly on the reconfigurable processors. In other implementations, the SDK provides libraries that contain predefined functions like linear algebra operations, element-wise tensor operations, non-linearities, and reductions required for creating, executing, and profiling the computation graphs on the reconfigurable processors. The SDK communicates with the deep learning frameworks via APIs.

A compiler 114 transforms the computation graphs into a hardware-specific configuration, which is specified in an execution file generated by the compiler 114. In one implementation, the compiler 114 partitions the computation graphs into memory allocations and execution fragments, and these partitions are specified in the execution file. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Different ones of the execution fragments can contain different amounts of computation. Execution fragments can represent parallel patterns or portions of parallel patterns and are executable asynchronously.

In some implementations, the partitioning of the computation graphs into the execution fragments includes treating calculations within at least one innermost loop of a nested loop of the computation graphs as a separate execution fragment. In other implementations, the partitioning of the computation graphs into the execution fragments includes treating calculations of an outer loop around the innermost loop of the computation graphs as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data required to implement the computation graphs, and these memory allocations are specified in the execution file. Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The compiler 114 binds memory allocations to virtual memory units and binds execution fragments to virtual compute units, and these bindings are specified in the execution file. In some implementations, the compiler 114 partitions execution fragments into memory fragments and compute fragments, and these partitions are specified in the execution file. A memory fragment comprises address calculations leading up to a memory access. A compute fragment comprises all other operations in the parent execution fragment. In one implementation, each execution fragment is broken up into a plurality of memory fragments and exactly one compute fragment. In one implementation, the compiler 114 performs the partitioning using reverse dataflow analysis such that inputs to an address used in a memory access are recursively flagged until the compiler 114 reaches either constant values or (bound) loop/pattern iterators. A single execution fragment can produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments of the execution fragments are configured to index into data structures. At least one of the memory fragments indexes into a data structure in the logical memory spaces of one of the memory allocations. Each compute and memory fragment preserves information about all loops whose loop bodies directly contain the operations in the corresponding execution fragment. In one implementation, this corresponds to replicating the calculation of the loop iterators of each loop into each compute and memory fragment. This replication allows each fragment to preserve the same iterative behavior as the original program while also allowing distributed calculation of loop iterators.

The compiler 114 assigns the memory fragments to the virtual memory units and assigns the compute fragments to the virtual compute units, and these assignments are specified in the execution file. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 114 allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file. The compiler 114 places the physical memory units and the physical compute units onto positions in an array of configurable units of the reconfigurable processor and routes data and control networks between the placed positions, and these placements and routes are specified in the execution file. In one implementation, this includes allocating physical resources such as counters and registers within each physical memory and compute unit, and these allocations are specified in the execution file.

The compiler 114 translates the applications 102 developed with commonly used open-source packages such as Keras and PyTorch into reconfigurable processor specifications. The compiler 114 generates the configuration files 124 with configuration data for the placed positions and the routed data and control networks. In one implementation, this includes assigning coordinates and communication resources of the physical memory and compute units by placing and routing units onto the array of the processor while maximizing bandwidth and minimizing latency.

The execution file includes configuration files 124 that implement the computation graphs of the applications 102 using the configurable units in the reconfigurable processors. A program executable contains a bit-stream representing the initial configuration, or starting state, of each of the configurable units that execute the program. This bit-stream is referred to as a bit file, or herein as a configuration file. The execution file includes a header that indicates destinations on the reconfigurable processors for configuration data in the configuration files 124. In some implementations, a plurality of configuration files is generated for a single application.

The execution file includes metadata 126 that accompanies the configuration files 124 and specifies modifications to the configuration files 124. The modifications specified in the metadata 126 include updates to argument data (or arguments) in the configuration files 124. The argument data specifies execution parameters of the applications 102. In some implementations, the arguments are specified by the users. In one implementation, the modifications specified in the metadata 126 include updates to memory mapping data in the configuration files 124. The memory mapping data translates virtual addresses of virtual data flow resources specified in the configuration files to physical addresses of the reconfigurable data flow resources allocated to the virtual data flow resources. In other implementations, the metadata 126 specify modifications/changes/alterations to any content or aspect of the configuration files 124 (e.g., the configuration data 212).

Figure 2:
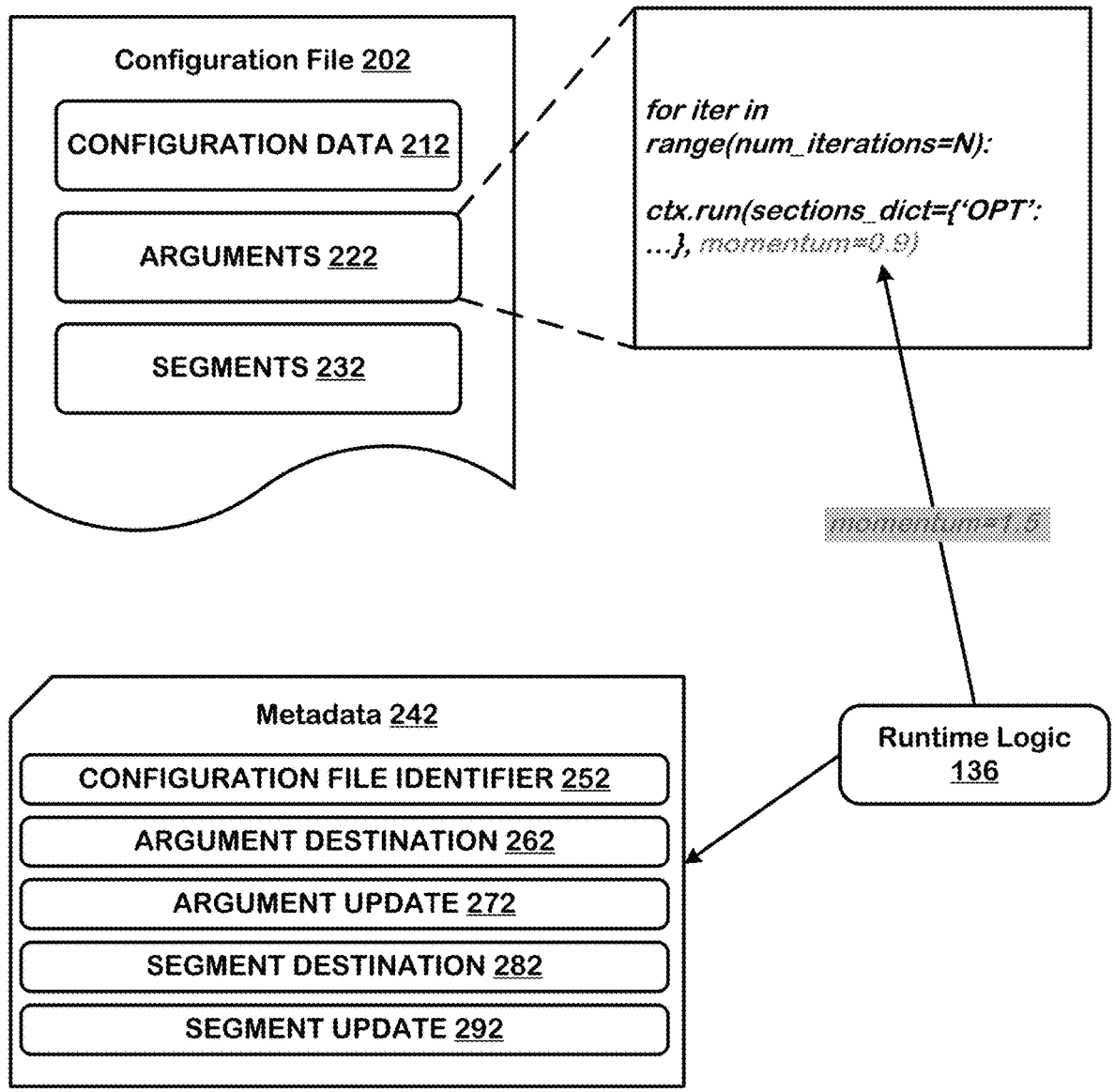
FIG. 2 depicts one example of modifying arguments in the configuration files using metadata.

In FIG. 2, a configuration file 202 comprises configuration data 212, arguments 222, and segments 232. In the illustrated example, the arguments 222 specify a learning rate momentum of "0.9" for stochastic gradient descent (SGD) training of a deep learning application. Metadata 242 includes argument update 272 to modify the momentum in the arguments 222 of the configuration file 202 from 0.9 to 1.5. The metadata 242 also specifies a configuration file identifier 252 to identify the configuration file 202 from among a plurality of configuration files. The metadata 242 also specifies an argument destination 262 to identify a location of the arguments 222 in the configuration file 202. The metadata 242 also specifies a segment destination 282 to identify a location of the segments 232 in the configuration file 202. The metadata 242 also specifies segment update 292 to modify the segments 232 in the configuration file 202. In other implementations, the metadata 242 specifies modifications to a plurality of configuration files.

A runtime processor 132, configured with runtime logic 136, uses the metadata 126 to modify the configuration files 124 to generate modified configuration files 146. The runtime processor 132, configured with the runtime logic 136, loads and executes the modified configuration files 146 on the arrays of configurable units in the pool of reconfigurable processors 158. The runtime processor 132, configured with the runtime logic 136, modifies the configuration files 124 based on the metadata N times to generate the modified configuration files 146, and iteratively loads and executes the modified configuration files 146 on the arrays of configurable units M times, where M>>N. In one example, the configuration files 124 are modified once (N=1) using the metadata 126 to generate the modified configuration files 146, and the modified configuration files 146 are iteratively loaded and executed on the arrays of configurable units ten thousand times (M=10000). In another example, the configuration files 124 are modified one hundred times (N=100) using the metadata 126 to generate the modified configuration files 146, and the modified configuration files 146 are iteratively loaded and executed on the arrays of configurable units ten thousand times (M=10000). In other examples, N can be 2, 5, 10, 20, 100, or 200, and M can be 500, 2000, 20000, 100000, or 1000000, but in general M>=N.

Turning back to FIG. 2, in some implementations, the configuration file 202 is generated with default values for the configuration data 212, the arguments 222, and/or the segments 232. Furthermore, the particular application for which the configuration file 202 is generated requires that the configuration file 202 be executed iteratively (e.g., ten thousand times) with updated values for the configuration data 212, the arguments 222, and/or the segments 232. Without the technology disclosed, the configuration file 202 would need to be updated ten thousand times to replace the default values with the updated values for each instance of the load and execution iteration, i.e., requiring a complementary update step for each iteration of load and execution steps, resulting in significant computational latency and waste of compute resources.

To avoid this, the technology disclosed modifies the configuration file 202 using the metadata 242 to generate a modified version of the configuration file 202, which is then iteratively loaded and executed. Accordingly, the technology disclosed obviates the redundant updates to the configuration file 202 by decoupling the update step from the iterative load and execution steps, and therefore produces savings in compute time and resources.

The metadata 126 also specifies configurations of virtual data flow resources required to execute the applications 102. In one example, the execution file can specify that a particular application needs an entire reconfigurable processor for execution, and as a result the metadata 126 identifies virtual data flow resources equaling at least the entire reconfigurable processor for loading and executing the configuration files 124 for the particular application. In another example, the execution file can specify that a particular application needs one or more portions of a reconfigurable processor for execution, and as a result the metadata 126 identifies virtual data flow resources equaling at least the one or more portions of the reconfigurable processor for loading and executing the configuration files 124 for the particular application. In yet another example, the execution file can specify that a particular application needs two or more reconfigurable processors for execution, and as a result the metadata 126 identifies virtual data flow resources equaling at least the two or more reconfigurable processors for loading and executing the configuration files 124 for the particular application. In yet another example, the execution file can specify that a particular application needs an entire first reconfigurable processor and one or more portions of a second reconfigurable processor for execution, and as a result the metadata 126 identifies virtual data flow resources equaling at least the first reconfigurable processor and the one or more portions of the second reconfigurable processor for loading and executing the configuration files 124 for the particular application.

In yet another example, the execution file can specify that a particular application needs an entire node for execution, and as a result the metadata 126 identifies virtual data flow resources equaling at least the entire node for loading and executing the configuration files 124 for the particular application. In yet another example, the execution file can specify that a particular application needs two or more nodes for execution, and as a result the metadata 126 identifies virtual data flow resources equaling at least the two or more nodes for loading and executing the configuration files 124 for the particular application. In yet another example, the execution file can specify that a particular application needs an entire first node and one or more reconfigurable processors of a second node for execution, and as a result the metadata 126 identifies virtual data flow resources equaling at least the entire first node and the one or more reconfigurable processors of the second node for loading and executing the configuration files 124 for the particular application.

One skilled in the art would appreciate that the execution file can similarly specify reconfigurable processors or portions thereof spanning across racks, pods, superpods, and zones in a data center, and as a result the metadata 126 identifies virtual data flow resources spanning across the racks, pods, superpods, and zones in the data center for loading and executing the configuration files 124 for the particular application.

As part of the metadata 126, the execution file includes topology information that specifies orientation or shapes of portions of a reconfigurable processor required to load and execute the configuration files 124 for a particular application. A reconfigurable processor includes an array of configurable units (e.g., compute units and memory units) in a programmable interconnect fabric. The array of configurable units is partitionable into a plurality of subarrays of configurable units. A subarray is a set (or grid) of configurable units in the array of configurable units. A subarray covers a portion of the array of configurable units. A tile is a portion of the array of configurable units with a certain number of configurable units.

In one implementation, a reconfigurable processor comprises a plurality of tiles of configurable units, for example, four tiles that form an array of configurable units in the reconfigurable processor. The topology information specifies an orientation of tiles in the plurality of tiles required to load and execute the configuration files 124 for a particular application. For example, when the particular application is allocated two tiles of the reconfigurable processor, the topology information specifies whether the two tiles are arranged in a vertical orientation (2V) or a horizontal orientation (2H). The topology information can also allocate a single tile (1T) of the reconfigurable processor to the particular application. The topology information can also allocate all four tiles (4T) of the reconfigurable processor to the particular application. In other implementations, other geometries may be specified, such as a group of three tiles.

The execution file also specifies virtual flow resources like PCIe channels, DMA channels, and DDR channels required to load and execute the configuration files 124 for a particular application. The execution file also specifies virtual flow resources like main memory (e.g., off-chip/external DRAM), local secondary storage (e.g., local disks (e.g., HDD, SSD)), remote secondary storage (e.g., distributed file systems, web servers), latches, registers, and caches (e.g., SRAM) required to load and execute the configuration files 124 for a particular application.

The execution file also specifies virtual memory segments for the request virtual flow resources, including virtual address spaces of the virtual memory segments and sizes of the virtual address spaces. The execution file also specifies symbols (e.g., tensors, streams) required to load and execute the configuration files 124 for a particular application. The execution file also specifies HOST FIFOs accessed by the configuration files 124 for a particular application during execution. The execution file also specifies peer-to-peer (P2P) streams (e.g., data flow exchanges and control token exchanges between sources and sinks) exchanged between configurable units on which the configuration files 124 for a particular application are loaded and executed. The execution file also specifies arguments that modify execution logic of a particular application by supplying additional parameters or new parameter values to the configuration files 124 for the particular application. The execution file also specifies functions (e.g., data access functions like transpose, alignment, padding) to be performed by the configurable units on which the configuration files 124 for a particular application are loaded and executed.

The runtime processor 132, configured with the runtime logic 136, receives the execution file from the SDK and uses the execution file for resource allocation, memory mapping, and execution of the configuration files for the applications 102 on the pool of reconfigurable processors 158. The runtime processor 132, configured with the runtime logic 136, communicates with the SDK over APIs (e.g., Python APIs). The runtime processor 132 can directly communicate with the deep learning frameworks over APIs (e.g., C/C++ APIs).

The runtime processor 132, configured with the runtime logic 136, parses the execution file and determines configurations of the virtual data flow resources required to execute the applications 102. The runtime processor 132, configured with the runtime logic 136, allocates physical configurable units and memory in the pool of reconfigurable data flow resources 158 to the virtual data flow resources. The runtime processor 132 then loads the configuration files for the applications 102 to the allocated physical configurable units. The runtime processor 132, configured with the runtime logic 136, then executes the applications 102 using the allocated physical configurable units and memory. The runtime processor 132, configured with the runtime logic 136, also includes logic to return the allocated physical configurable units and memory for an executed user application to the pool of reconfigurable data flow resources 158 for reallocation to another user application. The runtime processor 132, configured with the runtime logic 136, exchanges data with the pool of reconfigurable data flow resources 158, for example, over a PCIe interface.

An application for the purposes of this description includes the configuration files for reconfigurable data flow resources in the pool of reconfigurable data flow resources 158 compiled to execute a mission function procedure or set of procedures using the reconfigurable data flow resources, such as inferencing or learning in an artificial intelligence or machine learning system. A virtual machine for the purposes of this description comprises a set of reconfigurable data flow resources (including configurable units in one or more reconfigurable processor and bus and memory channels) configured to support execution of an application in an array or subarray of configurable units and associated bus and memory channels in a manner that appears to the application as if there were a physical constraint on the resources available, such as would be experienced in a physical machine. The virtual machine can be established as a part of the application of the mission function that uses the virtual machine, or it can be established using a separate configuration mechanism. In implementations described herein, virtual machines are implemented using resources of the pool of reconfigurable data flow resources 158 that are also used in the application, and so the configuration files for the application include the configuration data for its corresponding virtual machine, and links the application to a particular set of configurable units in the array or subarray of configurable units and associated bus and memory channels.

The runtime processor 132 implements a first application in virtual machine VM1 that is allocated a particular set of reconfigurable data flow resources and implements a second application in virtual machine VM2 that is allocated another set of reconfigurable data flow resources. Virtual machine VM1 includes a particular set of configurable units, which can include some or all configurable units of a single reconfigurable processor or of multiple reconfigurable processors, along with associated bus and memory resources (e.g., PCIe channels, DMA channels, DDR channels, DRAM memory). Virtual machine VM2 includes another set of configurable units, which can include some or all configurable units of a single reconfigurable processor or of multiple reconfigurable processors, along with associated bus and memory resources (e.g., PCIe channels, DMA channels, DDR channels, DRAM memory).

The runtime processor 132 respects the topology information in the execution file when allocating physical configurable units to the virtual data flow resources requested in the execution file. For example, due to the non-uniform communication bandwidth in East/West directions versus North/South directions in the reconfigurable processors, a virtual tile geometry that requires, for example, two tiles arranged horizontally, may suffer in performance if mapped to a physical tile geometry in which two tiles are arranged vertically. In some implementations, the topology information specifies rectilinear tile geometries.

As discussed above, the configurations of virtual data flow resources in the execution file specify virtual memory segments for the reconfigurable data flow resources in the pool of reconfigurable data flow resources 158, including virtual address spaces of the virtual memory segments and sizes of the virtual address spaces. The runtime processor 132 maps the virtual address spaces of the virtual memory segments to physical address spaces of physical memory segments in the memory. The memory can be host memory, or device memory (e.g., off-chip DRAM). The runtime processor 132 configures control and status registers of the reconfigurable data flow resources in the pool of reconfigurable data flow resources 158 with configuration data identifying the mapping between the virtual address spaces and the physical address spaces for the configuration files to access the physical memory segments during execution of the applications 102. Accordingly, a first set of the physical memory segments mapped to a first set of the reconfigurable data flow resources in the pool of reconfigurable data flow resources 158 allocated to a first application are different from a second set of the physical memory segments mapped to a second set of the reconfigurable data flow resources in the pool of reconfigurable data flow resources 158 allocated to a second application. Furthermore, access of the first set of the reconfigurable data flow resources is confined to the first set of the physical memory segments, and access of the second set of the reconfigurable data flow resources is confined to the second set of the physical memory segments.

Figure 3:
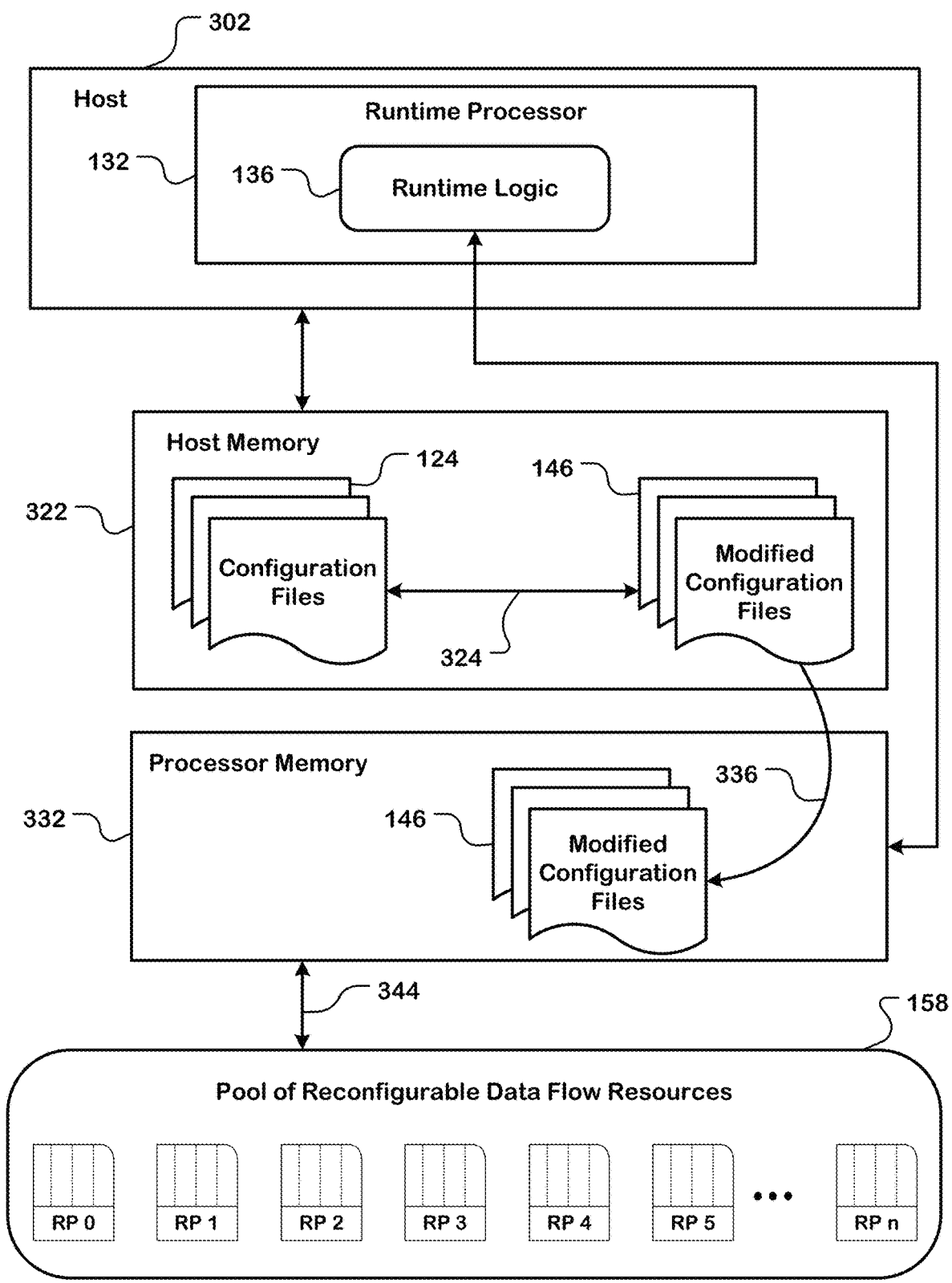
FIG. 3 portrays one implementation of modifying the configuration files in a host memory at runtime, loading the modified configuration files from the host memory to processor memory of a pool of reconfigurable data flow resources, and loading the modified configuration files from the processor memory onto configurable units in the pool of reconfigurable data flow resources.
Figure 4:
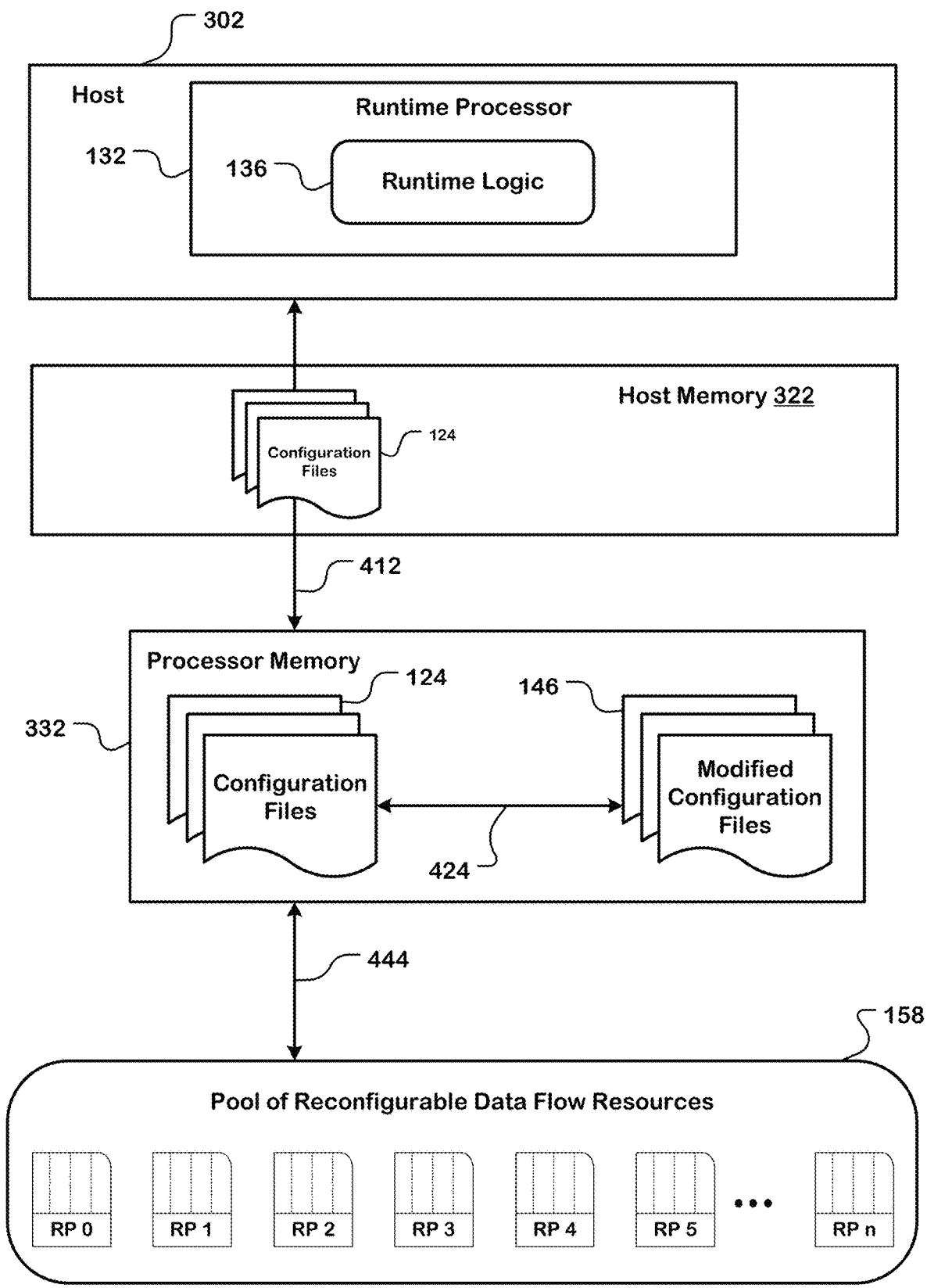
FIG. 4 illustrates one implementation of modifying the configuration files in the processor memory at runtime and loading the modified configuration files from the processor memory onto the configurable units in the pool of reconfigurable data flow resources.

Turning to FIGS. 3 and 4, in some implementations, the runtime processor 132 runs in a host 302, which is operatively coupled to the pool of reconfigurable data flow resources 158 (e.g., via a PCIe interface). The host 302 runs the software components for user request, compute resource, and communication management. In one implementation, the host 302 uses a PCIe interface that manages reconfiguration of the reconfigurable processors and movement of data into and out of the reconfigurable processors. A built-in arbiter guarantees fair communication bandwidth to every reconfigurable processor when multiple reconfigurable processors are communicating with the runtime processor 132.

The runtime processor 132 includes a runtime library that runs in a userspace of the host 302. The runtime processor 132 includes a kernel module that runs in a kernelspace of the host 302. The host 302 has host memory 322. In implementations disclosed herein, the runtime processor 132, based on virtual data flow resources requested in the execution file for configuration files of a particular application, allocates segments of the host memory 322 to a virtual machine that implements the particular application. In one implementation, the runtime processor 132 runs on top of Linux.

The runtime processor 132 partitions the physical hardware resources, i.e. the reconfigurable processors, into multiple virtual resources, and provides uniform and coherent access to these virtual resources as being physical in a balanced and unified view. It also manages all interactions among the applications 102 and their required resources by handling the traffic of application requests for reconfigurable resources, memory, and I/O channels.

In one implementation shown in FIG. 3, the runtime processor 132, configured with the runtime logic 136, modifies 324 the configuration files 124 using the metadata 126 to generate the modified configuration files 146 when the configuration files 124 are stored in the host memory 322 of the host 302. The modified configuration files 146 are stored in the host memory 322. In some implementations, the pool of reconfigurable data flow resources 158 include processor memory 332. The runtime processor 132, configured with the runtime logic 136, loads 336 the modified configuration files 146 from the host memory 322 onto the processor memory 332. The runtime processor 132, configured with the runtime logic 136, loads 344 the modified configuration files 146 from the processor memory 332 onto the arrays of configurable units in the pool of reconfigurable data flow resources 158 for execution.

In another implementation shown in FIG. 4, the runtime processor 132, configured with the runtime logic 136, modifies 324 the configuration files 124 using the metadata 126 to generate the modified configuration files 146 when the configuration files 124 are stored in the processor memory 332 of the pool of reconfigurable data flow resources 158. That is, the configuration files 124 are first loaded 412 from the host memory 322 of the host 302 to the processor memory 332, and then modified 424 at the processor memory 332. The modified configuration files 146 are stored in the processor memory 332. The runtime processor 132, configured with the runtime logic 136, loads 444 the modified configuration files 146 from the processor memory 332 onto the arrays of configurable units in the pool of reconfigurable data flow resources 158 for execution.

Figure 5:
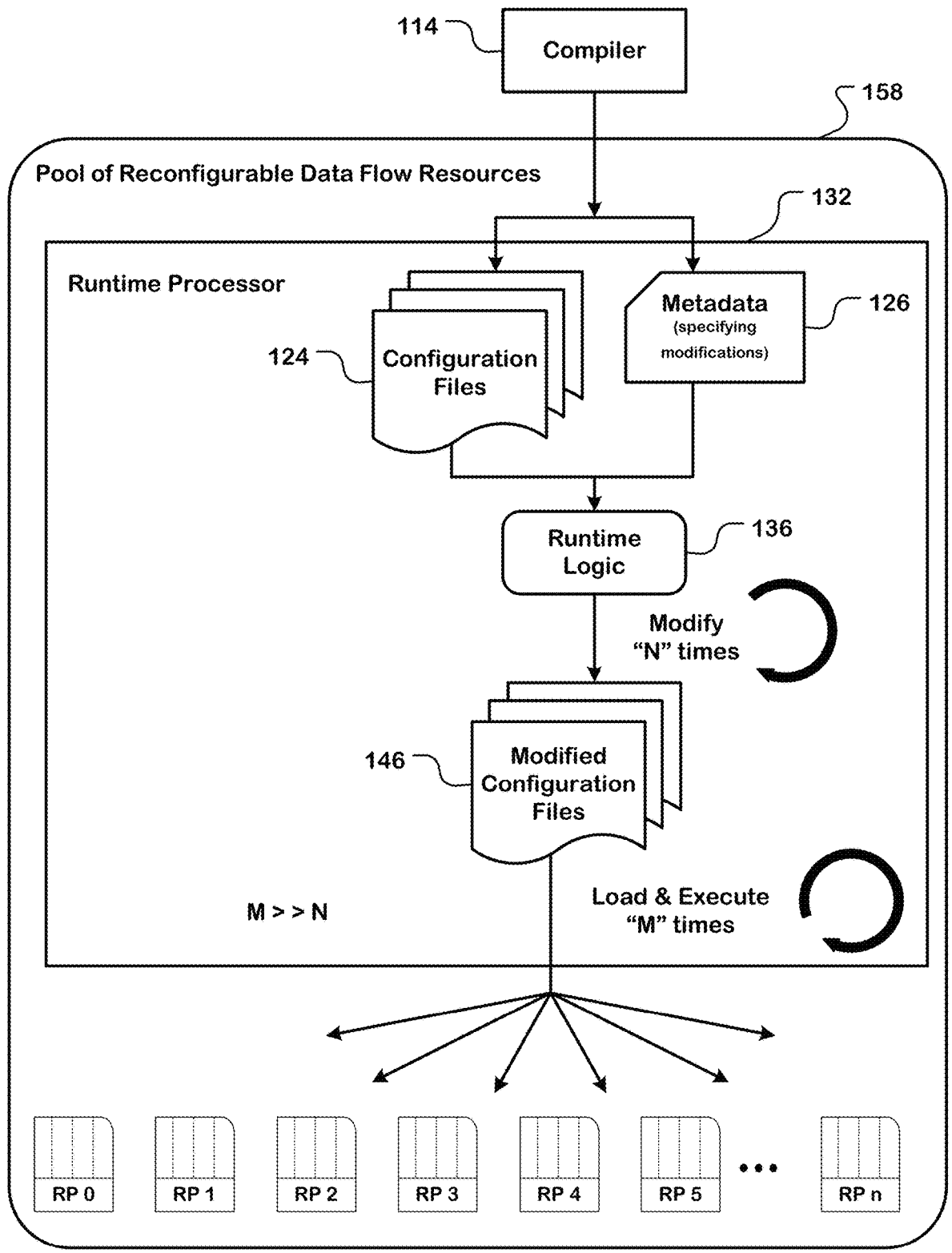
FIG. 5 shows one implementation of a runtime processor, running in the pool of reconfigurable data flow resources, modifying the configuration files at runtime and loading the modified configuration files onto the configurable units in the pool of reconfigurable data flow resources.

In yet another implementation shown in FIG. 5, the runtime processor 132, configured with the runtime logic 136, is part of the pool of reconfigurable data flow resources 158, instead of the host 302 (as shown in FIGS. 3 and 4). In such an implementation, the runtime processor 132, configured with the runtime logic 136, receives the configuration files 124 and the metadata 126 from the compiler 114. The runtime processor 132, configured with the runtime logic 136, modifies the configuration files 124 using the metadata 126 to generate the modified configuration files 146 when the configuration files 124 are stored on the arrays of configurable units in the pool of reconfigurable data flow resources 158. That is, the configuration files 124 are first loaded onto the arrays of configurable units, and then modified at the arrays of configurable units. The modified configuration files 146 are stored on the arrays of configurable units. The runtime processor 132, configured with the runtime logic 136, executes the modified configuration files 146 on the arrays of configurable units.

In some other implementations, the runtime processor 132, configured with the runtime logic 136, modifies 324 the configuration files 124 using the metadata 126 to generate the modified configuration files 146 when the configuration files 124 are stored in the host memory 322 of the host 302. The modified configuration files 146 are stored in the host memory 322. The runtime processor 132, configured with the runtime logic 136, loads 336 the modified configuration files 146 from the host memory 322 onto the arrays of configurable units in the pool of reconfigurable data flow resources 158 for execution.

Figure 6:
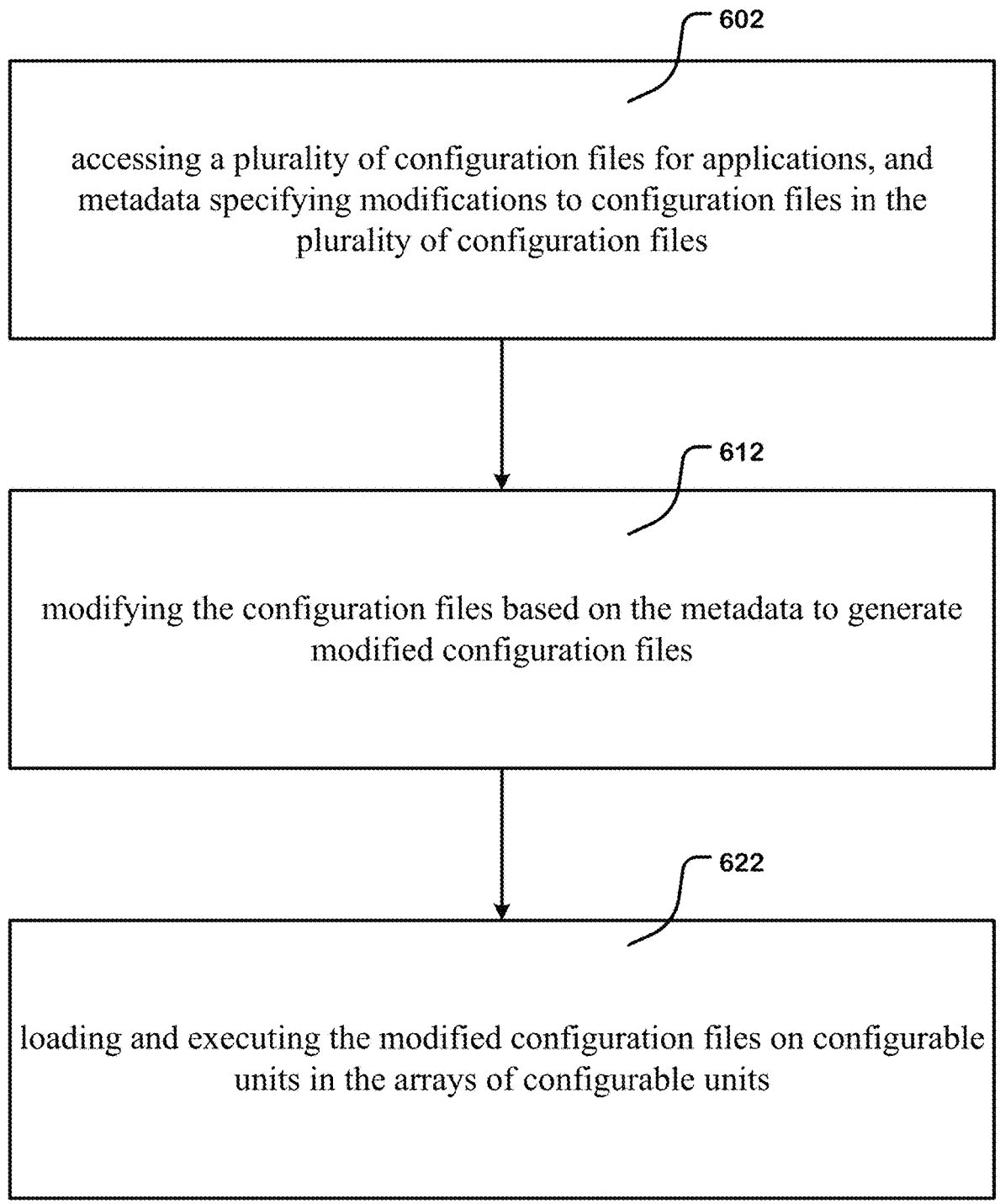
FIG. 6 depicts one implementation of a computer-implemented method of runtime patching of configuration files.

FIG. 6 depicts one implementation of a computer-implemented method of runtime patching of configuration files.

At action 602, the method includes accessing a plurality of configuration files for applications, and metadata specifying modifications to configuration files in the plurality of configuration files, the configuration files generated as a result of compiling the applications, and including configuration data for configuring a pool of reconfigurable data flow resources to run the applications, reconfigurable data flow resources in the pool of reconfigurable data flow resources including arrays of configurable units.

At action 612, the method includes modifying the configuration files based on the metadata to generate modified configuration files.

At action 622, the method includes loading and executing the modified configuration files on configurable units in the arrays of configurable units.

Figure 7:
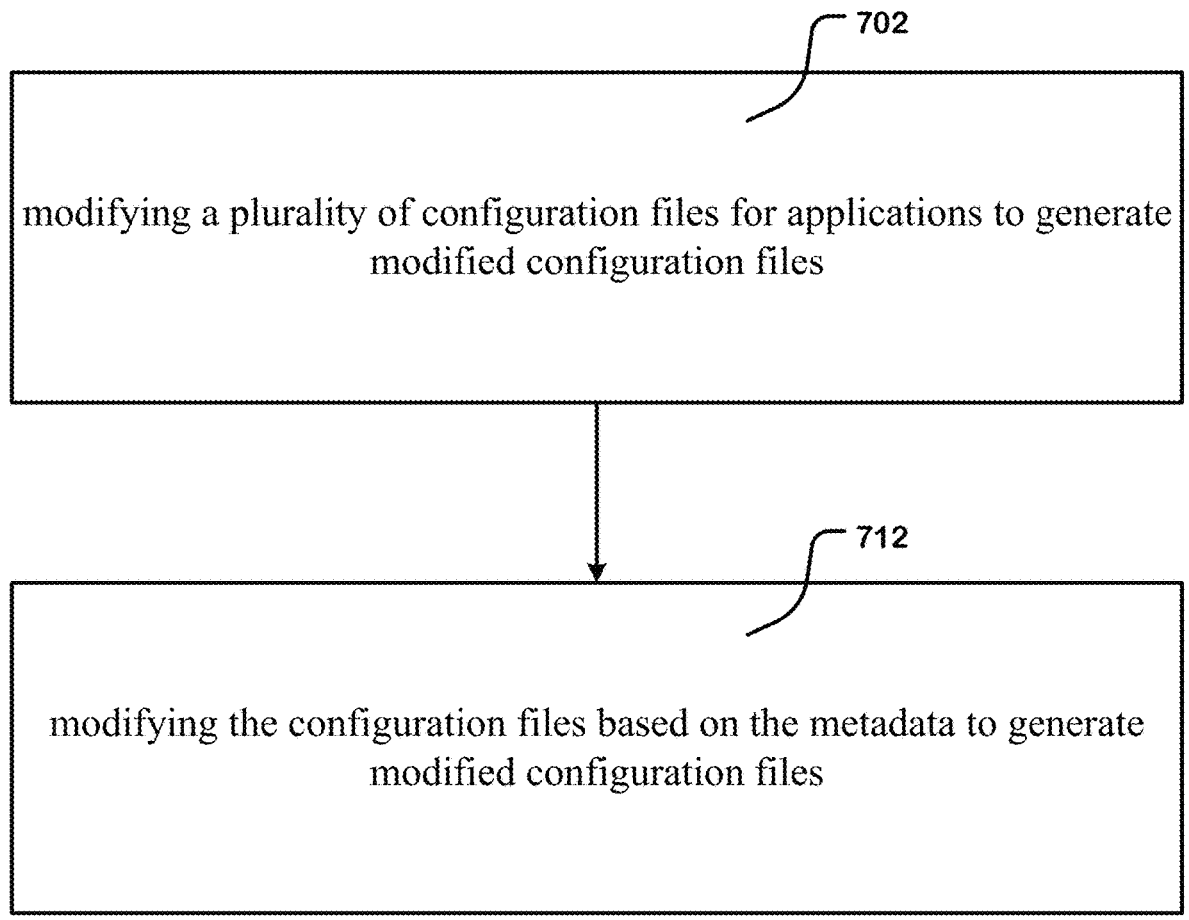
FIG. 7 portrays another implementation of a computer-implemented method of runtime patching of configuration files.

FIG. 7 portrays another implementation of a computer-implemented method of runtime patching of configuration files.

At action 702, the method includes modifying a plurality of configuration files for applications to generate modified configuration files, configuration files in the plurality of configuration files generated as a result of compiling the applications, and including configuration data for configuring configurable units in an array of configurable units to run the applications.

At action 712, the method includes loading and executing the modified configuration files on the configurable units in the array of configurable units.

The technology disclosed proposes a mechanism to allow the deferral of program control flow decisions until just prior to execution by dynamic patching of the program binaries on a distributed computing environment, avoiding the need for re-compilation. For a program running multiple loops in a large distributed computing environment, a mechanism to selectively update program logic everywhere just prior to commencing a new loop is disclosed.

Argument values are stored in the program binary (bitfile). Each argument is catalogued inside the program bitfile with all information necessary to update the argument value without otherwise affecting the program behavior, i.e. the rest of the contents of the bitfile. Arguments are updated using a combination of a "pull" and "push" model using a two-step process. In the first step, an updated argument is first copied over to the argument update table which has a list of all hardware elements which uses the argument. Each argument is then "pushed" to these hundreds or thousands of processing elements and local caches by the argument update logic in hardware. With this invention, the main program itself is modified on the host-memory or in processor memory by walking over the program bitfile and updating only the relevant argument bits which are affected by the argument modification. The modified program bitfile is then loaded onto the processor memory and hardware argument-load logic is used wherein the new argument values get loaded onto the respective processing and memory elements. The next iteration of the program runs with updated arguments, whereas all remaining portions of the program are unchanged.

A hardware argument-load is faster than dynamically updating each argument from the runtime processor, especially as the number of places the argument would need to be updated in each processor component grows large. Even though some time is spent in the runtime processor updating the program binary on the fly, this time is easily amortized for a long running program, e.g., neural network training. In a training loop which runs millions of times, argument updates every one hundred or so iterations of the program greatly benefit from being able to run a program which can be bitfile-patched on the fly instead of being recompiled.

While dynamic bitfile patching can be used to provide argument updates to the processing units, the use case is not limited to argument updates. A variety of structures can be embedded within a program bitfile and updated without recompiling the program. Another use case is updating the translation table entries within the program bitfiles. The disclosed method provides a general framework to update the bitfile and the ability to decipher and execute the bitfile using those changes.

Figure 8:
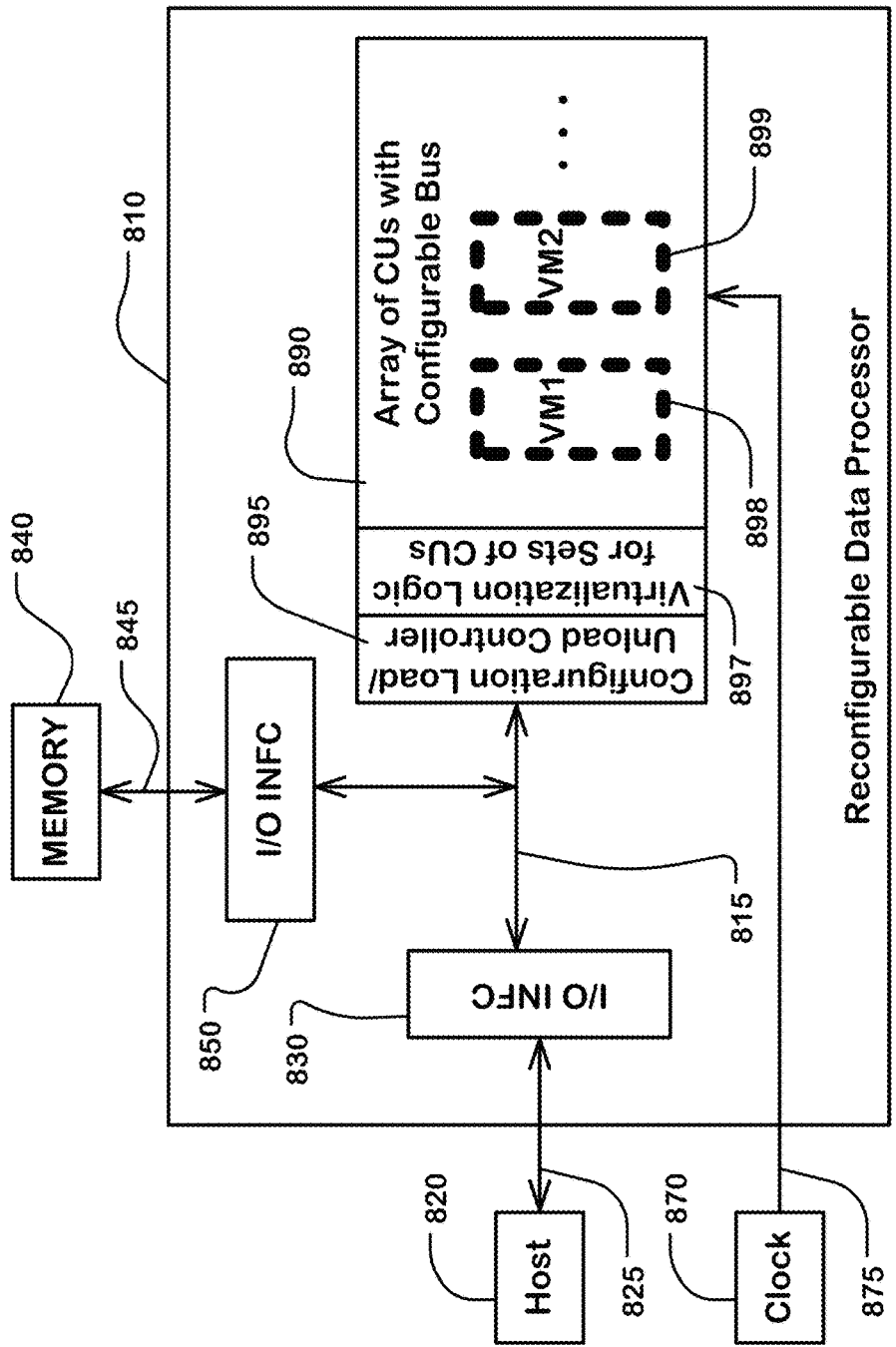
FIG. 8 is a system diagram illustrating a system including a host, a memory, and a reconfigurable data processor.

FIG. 8 is a diagram illustrating a system 800 including a host 820, a memory 840, and a reconfigurable data processor 810 in which a computation unit as described herein is deployed by hardware or by configuration of reconfigurable components and configured with the virtualization logic 897. As shown in the example of FIG. 8, the reconfigurable data processor 810 includes an array 890 of configurable units and a configuration load/unload controller 895.

The virtualization logic 897 can include resources that support or enable simultaneous execution of multiple, unrelated application graphs (or related ones) in an array of configurable units on one die or one multichip module. In the illustration, a first application graph is implemented in virtual machine VM1 in a particular set 898 of configurable units, and a second application graph is implemented in virtual machine VM2 in another set 899 of configurable units.

Figure 11:
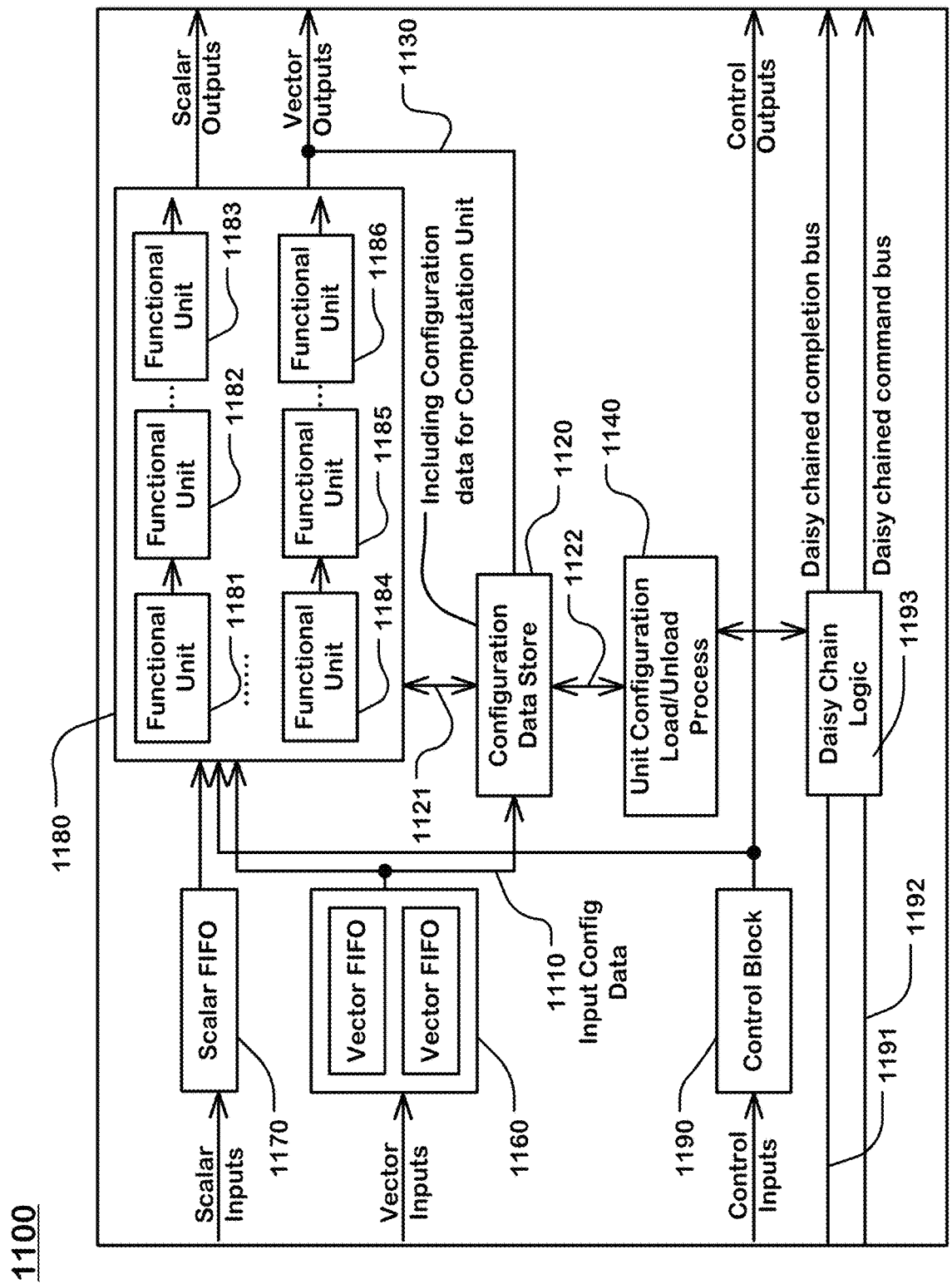
FIG. 11 is a block diagram illustrating an example configurable unit, such as a Pattern Compute Unit (PCU).
Figure 12:
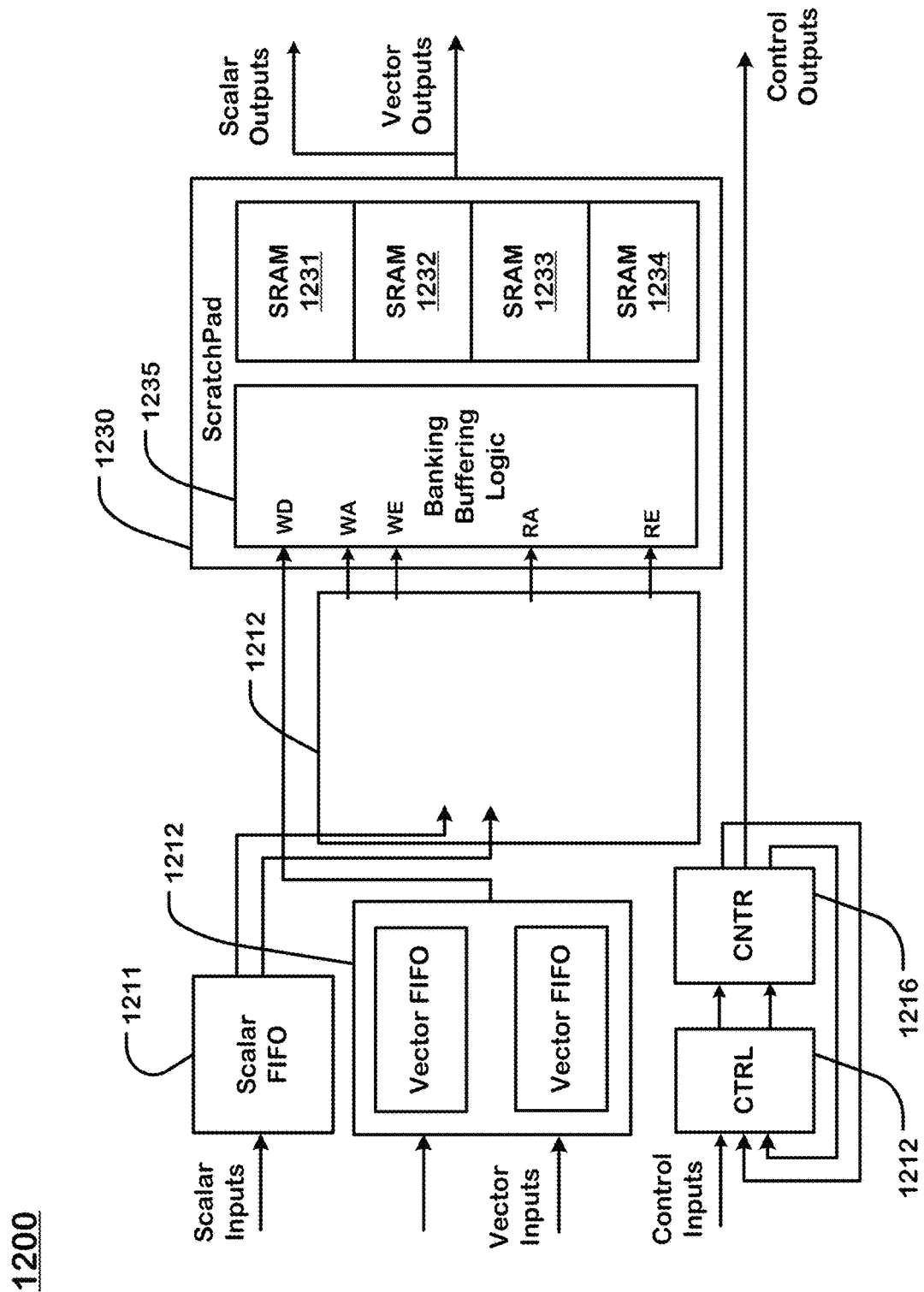
FIG. 12 is a block diagram illustrating an example configurable unit, such as a Pattern Memory Unit (PMU).

Configurable units in an array 890 of configurable units are further described in reference to FIGS. 11 and 12 and configured with the virtualization logic 897. Configurable units can include, or can have units configured to implement, a computation unit or computation units, as described herein.

The processor 810 includes an external I/O interface 830 connected to the host 820 by line 825, and an external I/O interface 850 connected to the memory 840 by line 845. The I/O interfaces 830, 850 connect via a bus system 815 to the array 890 of configurable units and to the configuration load/unload controller 895. The bus system 815 may have a bus width of carrying one chunk of data, which can be for this example 128 bits (references to 128 bits throughout can be considered as an example chunk size more generally).

To configure configurable units in the array 890 of configurable units with a configuration file, the host 820 can send the configuration file to the memory 840 via the interface 830, the bus system 815, and the interface 850 in the reconfigurable data processor 810. The configuration file can be loaded in many ways, as suits a particular architecture, including in data paths outside the configurable processor 810. The configuration file can be retrieved from the memory 840 via the memory interface 850. Chunks of the configuration file can then be sent in a distribution sequence to configurable units in the array 890 of configurable units in the reconfigurable data processor 810.

An external clock generator 870 or other clock line sources can provide a clock line 875 or clock lines to elements in the reconfigurable data processor 810, including the array 890 of configurable units, and the bus system 815, and the external data I/O interfaces. The bus system 815 can communicate data at a processor clock rate via a clock line 875 or clock lines.

Figure 9:
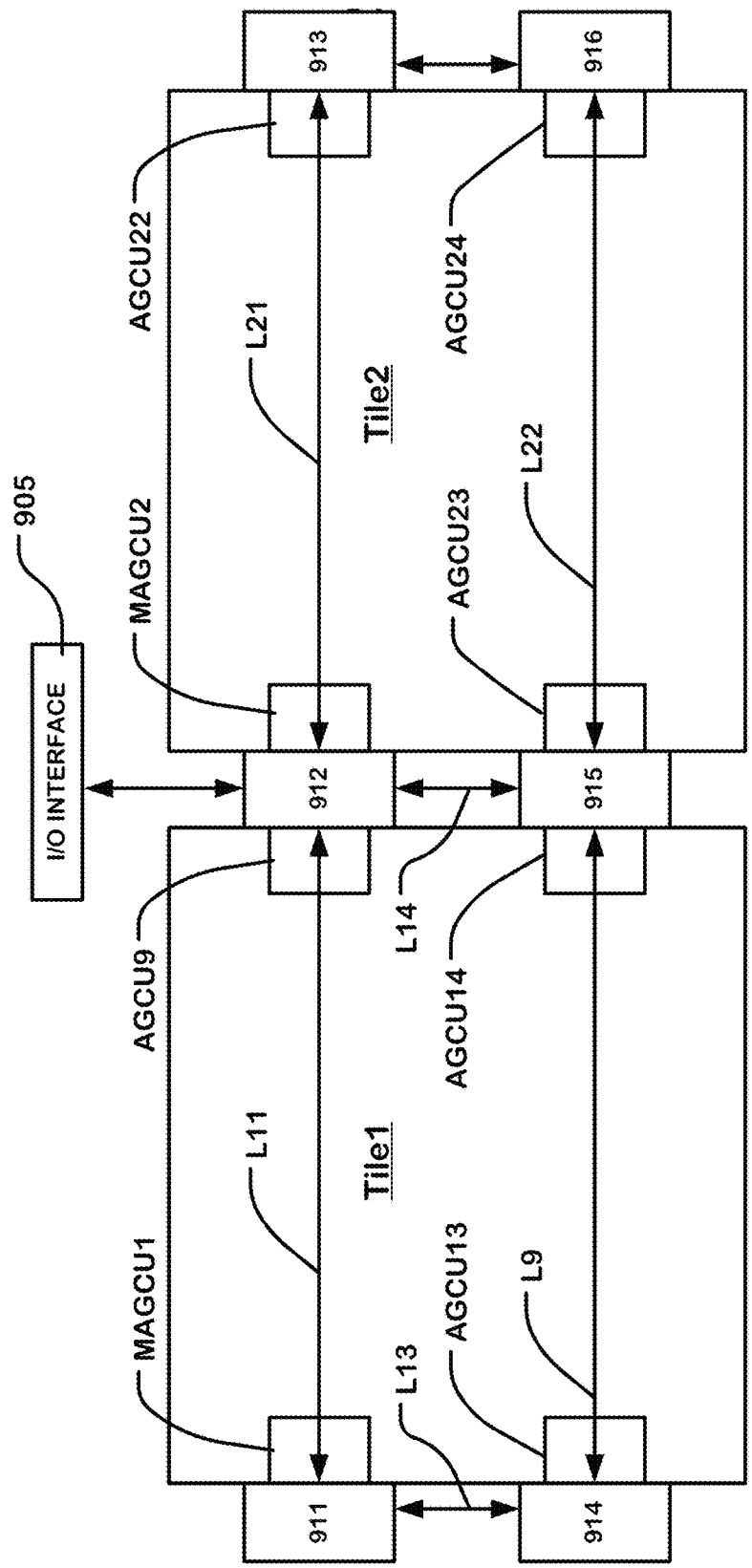
FIG. 9 is a simplified block diagram of a top-level network and components of a CGRA (Coarse Grain Reconfigurable Architecture).
Figure 10:
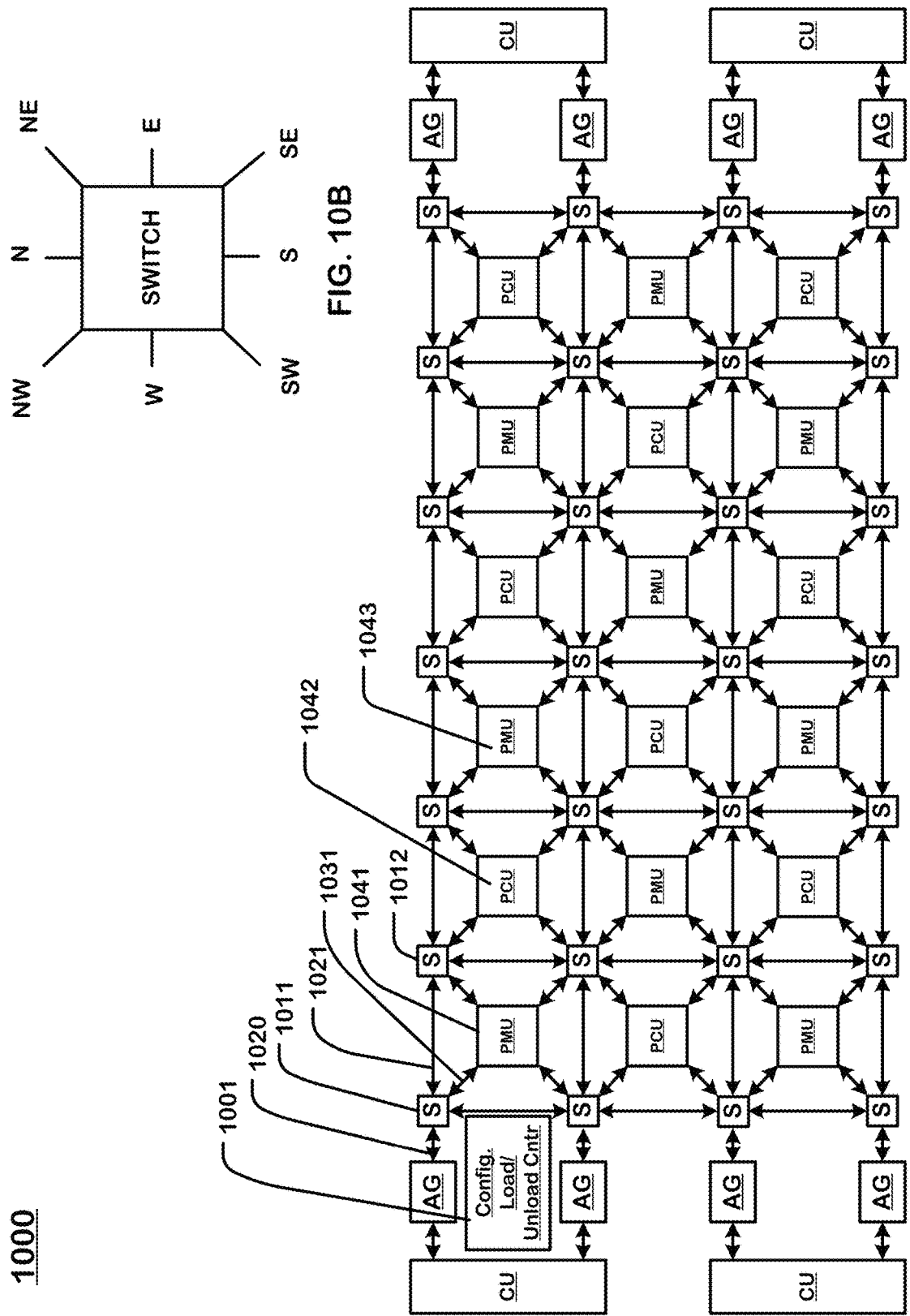
FIG. 10 is a simplified diagram of a tile and an array level network usable in the configuration of FIG. 8, where the configurable units are nodes on the array level network and are configurable to implement a lookup table with input offsetting.

FIG. 9 is a simplified block diagram of components of a CGRA (coarse-grained reconfigurable architecture) processor. In this example, the CGRA processor has 2 tiles (Tile1, Tile2). The tile comprises an array of configurable units connected to a bus system, including array level networks in this example. An array of configurable units (e.g., 890, FIG. 8) in the tile includes computation units in hardware or by configuration of reconfigurable components, which are configured with the virtualization logic 897. The bus system includes a top-level network connecting the tiles to external I/O interface 905 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g., MAGCU1, AGCU9, AGCU13, AGCU14). The AGCUs are nodes on the top-level network and nodes on the array level networks and include resources for routing data among nodes on the top-level network and nodes on the array level network in each tile.

Nodes on the top-level network in this example include one or more external I/Os, including interface 905. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (911-916) connecting to each other as well as to other nodes on the top-level network, including the AGCUs, and I/O interface 905. The top-level network includes links (e.g., L11, L9, L21, L22) connecting the top-level switches. Data travels in packets between the top-level switches on the links, and from the switches to the nodes on the network connected to the switches. For example, top-level switches 911 and 912 are connected by a link L11, top-level switches 914 and 915 are connected by a link L9, top-level switches 911 and 914 are connected by a link L13, and top-level switches 912 and 913 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM, 209.

Top-level switches can be connected to AGCUs. For example, top-level switches 911, 912, 914, and 915 are connected to MAGCU1, AGCU9, AGCU13 and AGCU14 in the tile Tile1, respectively. Top-level switches 912, 913, 915, and 916 are connected to MAGCU2, AGCU22, AGCU23 and AGCU24 in the tile Tile2, respectively.

Top-level switches can be connected to one or more external I/O interfaces (e.g., interface 905).

FIG. 10A is a simplified diagram of a tile and an array level network usable in the configuration of FIG. 9, where the configurable units in the array are nodes on the array level network and are configurable to implement the virtualization logic 897.

In this example, the array of configurable units 1000 includes a plurality of types of configurable units, which are configured with the virtualization logic 897. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns," ISCA '17, Jun. 24-28, 2017, Toronto, ON, Canada, which is incorporated by reference as if fully set forth herein. In this example, the PCUs (e.g., 1042) and PMUs (e.g., 1043) in the array of configurable units 1000 can include resources configurable for embodiment of a computation unit, an example configuration of which is described herein. Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the virtualization logic 897. Program Load may also require the load of all PMU memories.

The array level network includes links interconnecting configurable units in the array. The links in the array level network include one or more and, in this case, three kinds of physical buses: a chunk-level vector bus (e.g., 128 bits of data), a word-level scalar bus (e.g., 32 bits of data), and a multiple bit-level control bus. For instance, interconnect 1021 between switch units 1011 and 1012 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. If, for example, N=6, the chunks are sent out in most-significant-bit-first order of Chunk 5->Chunk 4->Chunk 3->Chunk 2->Chunk 1->Chunk 0. (Note that this most-significant-bit-first order results in Chunk 5 being distributed in round 0 of the distribution sequence from the array configuration load controller.) For an unload operation, the configuration unload controller can write the unload data out of order to the memory. For both load and unload operations, the shifting in the configuration serial chains in a configuration data store in a configurable unit is from LSB (least-significant-bit) to MSB (most-significant-bit), or MSB out first.

FIG. 10B illustrates an example switch unit connecting elements in an array level network. As shown in the example of FIG. 10B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the eight interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 1041 can be sent from the configuration load/unload controller 1001 to the PMU 1041, via a link 1020 between the configuration load/unload controller 1001 and the West (W) vector interface of the switch unit 1011, the switch unit 1011, and a link 1031 between the Southeast (SE) vector interface of the switch unit 1011 and the PMU 1041.

In this example, one of the AGCUs is configured to be a master AGCU, which includes a configuration load/unload controller (e.g., 1001). The master AGCU implements a register through which the host (820, FIG. 8) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 11). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (850, FIG. 8). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 11 is a block diagram illustrating an example configurable unit 1100, such as a Pattern Compute Unit (PCU), which is configured with the virtualization logic 897. A configurable unit can interface with the scalar, vector, and control buses, in this example using three corresponding sets of inputs and outputs (IO): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 1190, and control outputs are provided by the control block 1190.

Each vector input is buffered in this example using a vector FIFO in a vector FIFO block 1160 which can include one or more vector FIFOs. Likewise, in this example, each scalar input is buffered using a scalar FIFO 1170. Using input FIFOs decouples timing between data producers and consumers and simplifies inter-configurable-unit control logic by making it robust to input delay mismatches.

A configurable unit includes multiple reconfigurable data paths in block 1180. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 1120 is connected to the multiple data paths in block 1180 via lines 1121.

A configurable data path organized as a multi-stage pipeline can include multiple functional units (e.g., 1181, 1182, 1183, 1184, 1185, 1186) at respective stages. A computation unit or parts of a computation unit can be implemented in multiple functional units at respective stages in a multi-stage pipeline or in multiple multi-stage pipelines. In the example as shown in FIG. 9, a circuit including the virtualization logic 897 can be implemented in multiple functional units and multiple memory units. Input registers in functional units can register inputs from scalar FIFOs 1170 or Vector FIFOs 1160 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 1120 (e.g., serial chains) to store unit files comprising a plurality of chunks (or sub-files of other sizes) of configuration data particular to the corresponding configurable units. Configurable units in the array of configurable units each include unit configuration load logic 1140 connected to the configuration data store 1120 via line 1122, to execute a unit configuration load process. The unit configuration load process includes receiving, via the bus system (e.g., the vector inputs), chunks of a unit file particular to the configurable unit and loading the received chunks into the configuration data store 1120 of the configurable unit. The unit file loaded into the configuration data store 1120 can include configuration data, including opcodes and routing configuration, for circuits (e.g., module) implementing the virtualization logic 897 in multiple functional units and multiple memory units, as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 1110 can be provided to a vector FIFO as vector inputs, and then be transferred to the configuration data store 1120. Output configuration data 1130 can be unloaded from the configuration data store 1120 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 11, a control block 1190, a daisy-chained completion bus 1191 and a daisy-chained command bus 1192 are connected to daisy-chain logic 1193, which communicates with the unit configuration load logic 1140. The daisy-chain logic 1193 can include load complete status logic, as described below. The daisy-chained completion bus is further described below. Other topologies for the command and completion buses are clearly possible but not described here.

FIG. 12 is a block diagram illustrating an example configurable unit 1200, such as a Pattern Memory Unit (PMU), which is configured with the virtualization logic 897 (i.e., the ready-to-read credit counter, the write credit counter, and the flow control logic for operating them). A PMU can contain scratchpad memory 1230 coupled with a reconfigurable scalar data path 1212 intended for address calculation (RA, WA) and control (WE, RE) of the scratchpad memory 1230, along with the bus interfaces used in the PCU (FIG. 11).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g., 1231-1234). Banking and buffering logic 1235 for the SRAM banks in the scratchpad can be configured to operate in several banking modes to support various access patterns. A computation unit as described herein can include a lookup table stored in the scratchpad memory 1230, from a configuration file or from other sources. In a computation unit as described herein, the scalar data path 1212 can translate a section of a raw input value I for addressing lookup tables implementing a function f(I), into the addressing format utilized by the SRAM scratchpad memory 1230, adding appropriate offsets and so on, to read the entries of the lookup table stored in the scratchpad memory 1230 using the sections of the input value I. Each PMU can include write address calculation logic and read address calculation logic that provide write address WA, write enable WE, read address RA and read enable RE to the banking buffering logic 1235. Based on the state of the local FIFOs 1211 and 1212 and external control inputs, the control block 1212 can be configured to trigger the write address computation, read address computation, or both, by enabling the appropriate counters 1216. A programmable counter chain 1216 (Control Inputs, Control Outputs) and control block 1212 can trigger PMU execution.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A data processing system, comprising:
    a pool of reconfigurable data flow resources, reconfigurable data flow resources in the pool of reconfigurable data flow resources including arrays of configurable units, configurable units in the arrays of configurable units comprising physical hardware resources; and
    a host operatively coupled to the pool of reconfigurable data flow resources and configured with runtime logic to:
        receive a plurality of configuration files for applications, and metadata specifying modifications to configuration files in the plurality of configuration files;

modify the configuration files based on the metadata to generate modified configuration files; and
load and execute the modified configuration files on the arrays of configurable units;
wherein the runtime logic comprises software running on a processor in the host,
wherein the runtime logic modifies the configuration files based on the metadata N times to generate the modified configuration files, and iteratively loads and executes the modified configuration files on the arrays of configurable units M times, wherein M>>N, and N is greater than one.

2. The data processing system of claim 1, wherein M>=N.

3. The data processing system of claim 1, wherein the modifications include updates to argument data in the configuration files, wherein the argument data specifies execution parameters of the applications.

4. The data processing system of claim 3, wherein the metadata identifies locations of the argument data in the configuration files.

5. The data processing system of claim 1, wherein the modifications include updates to memory mapping data in the configuration files, wherein the memory mapping data translates virtual addresses of virtual data flow resources specified in the configuration files to physical addresses of the reconfigurable data flow resources allocated to the virtual data flow resources.

6. The data processing system of claim 5, wherein the configuration files contain bit streams, wherein the modifications include changing bits in the bit streams.

7. The data processing system of claim 1, wherein the host has host memory.

8. The data processing system of claim 7, wherein the runtime logic stores the modified configuration files in the host memory.

9. The data processing system of claim 8, wherein the reconfigurable data flow resources include processor memory.

10. The data processing system of claim 9, wherein the runtime logic loads the modified configuration files from the host memory onto the processor memory.

11. The data processing system of claim 10, wherein the runtime logic loads the modified configuration files from the processor memory onto the arrays of configurable units for execution.

12. The data processing system of claim 1, wherein the configuration files are generated by a compiler running in the host.

13. A data processing system, comprising:
a pool of reconfigurable data flow resources, reconfigurable data flow resources in the pool of reconfigurable data flow resources including arrays of configurable units and processor memory, configurable units in the arrays of configurable units comprising physical hardware resources; and
a host operatively coupled to the pool of reconfigurable data flow resources and having host memory, and configured with runtime logic to:
receive a plurality of configuration files for applications, and metadata specifying modifications to configuration files in the plurality of configuration files;
load the configuration files on the processor memory;
modify the configuration files loaded on the processor memory based on the metadata to generate modified configuration files; and
load and execute the modified configuration files on the arrays of configurable units, wherein the runtime logic modifies the configuration files N times to generate the modified configuration files, and iteratively loads and executes the modified configuration files on the configurable units M times, wherein M>>N, and N is greater than one.

14. A data processing system, comprising:
a pool of reconfigurable data flow resources, reconfigurable data flow resources in the pool of reconfigurable data flow resources including arrays of configurable units and a runtime processor, configurable units in the arrays of configurable units comprising physical hardware resources; and
the runtime processor configured with runtime logic to:
receive a plurality of configuration files for applications, and metadata specifying modifications to configuration files in the plurality of configuration files;
modify the configuration files based on the metadata to generate modified configuration files; and
load and execute the modified configuration files on the arrays of configurable units, wherein the runtime logic modifies the configuration files N times to generate the modified configuration files, and iteratively loads and executes the modified configuration files on the configurable units M times, wherein M>>N, and N is greater than one.

15. A system, comprising:
an array of configurable units, configurable units in the arrays of configurable units comprising physical hardware resources; and
runtime logic configured to
modify a plurality of configuration files for applications to generate modified configuration files, configuration files in the plurality of configuration files generated as a result of compiling the applications, and including configuration data for configuring configurable units in the array of configurable units to run the applications; and
load and execute the modified configuration files on the configurable units in the array of configurable units, wherein the runtime logic modifies the configuration files N times to generate the modified configuration files, and iteratively loads and executes the modified configuration files on the configurable units M times, wherein M>>N, and N is greater than one.

16. The system of claim 15, wherein M>=N.

17. The system of claim 15, wherein the runtime logic modifies the configuration files by updating argument data in the configuration files, wherein the argument data specifies execution parameters of the applications.

18. The system of claim 15, wherein the runtime logic modifies the configuration files by updating memory mapping data in the configuration files, wherein the memory mapping data translates virtual addresses of virtual data flow resources specified in the configuration files to physical addresses of the reconfigurable data flow resources allocated to the virtual data flow resources.

* * * * *